United States Patent
Wyle et al.

(10) Patent No.: US 12,148,050 B2
(45) Date of Patent: Nov. 19, 2024

(54) TAXPAYERS SWITCHING TAX PREPARERS

(71) Applicant: Sureprep, LLC, Irvine, CA (US)

(72) Inventors: David Wyle, Corona Del Mar, CA (US); Sarika Arora, Rancho Santa Margarita, CA (US)

(73) Assignee: SurePrep, LLC, Irvine, CA (US)

( * ) Notice: Subject to any disclaimer, the term of this patent is extended or adjusted under 35 U.S.C. 154(b) by 0 days.

(21) Appl. No.: 18/207,033

(22) Filed: Jun. 7, 2023

(65) Prior Publication Data

US 2023/0316421 A1 Oct. 5, 2023

Related U.S. Application Data

(63) Continuation of application No. 17/557,574, filed on Dec. 21, 2021, now Pat. No. 11,710,192, which is a continuation of application No. 15/832,640, filed on Dec. 5, 2017, now Pat. No. 11,238,540.

(51) Int. Cl.
*G06Q 40/00* (2023.01)
*G06Q 40/12* (2023.01)

(52) U.S. Cl.
CPC .................. *G06Q 40/123* (2013.12)

(58) Field of Classification Search
CPC ........ G06Q 40/02; G06Q 40/10; G06Q 40/12; G06Q 40/20; G06Q 40/123; G06Q 40/1085; G06Q 40/207; G06F 21/31
USPC ................................................. 705/4, 35–45
See application file for complete search history.

(56) References Cited

U.S. PATENT DOCUMENTS

| | | |
|---|---|---|
| 3,963,910 A | 6/1976 | Enomoto et al. |
| 4,754,326 A | 6/1988 | Kram et al. |
| 5,054,096 A | 10/1991 | Beizer |
| 5,144,115 A | 9/1992 | Yoshida |
| 5,404,294 A | 4/1995 | Karnik |
| 5,737,599 A | 4/1998 | Rowe et al. |
| 5,787,295 A | 7/1998 | Nakao |

(Continued)

OTHER PUBLICATIONS

USPTO; Notice of Allowance dated May 16, 2023 in U.S. Appl. No. 17/557,574.

(Continued)

*Primary Examiner* — Cho Kwong
*Assistant Examiner* — Mohammed H Mustafa
(74) *Attorney, Agent, or Firm* — SNELL & WILMER L.L.P.

(57) ABSTRACT

Methods, systems, and apparatus for automatically obtaining tax documents. The system includes a taxpayer client device and a server configured to automatically identify tax return items associated with the taxpayer by analyzing a prior year tax return. The server is configured to generate a list of tax return items including the automatically identified tax return items. The server is configured to receive, from the taxpayer client device, authentication data for a third party database. The server is configured to access the third party database using the authentication data. The server is configured to receive a document from the third party database and automatically determine whether the document corresponds to a tax return item from the list of tax return items. The server is configured to automatically store the document when the document corresponds to one of the tax return items from the list of tax return items.

20 Claims, 12 Drawing Sheets

(56) References Cited

U.S. PATENT DOCUMENTS

| | | |
|---|---|---|
| 5,848,426 A | 12/1998 | Wang et al. |
| 5,878,215 A | 3/1999 | Kling et al. |
| 5,881,381 A | 3/1999 | Yamashita |
| 5,923,842 A | 7/1999 | Pedersen et al. |
| 5,940,811 A | 8/1999 | Norris |
| 5,963,659 A | 10/1999 | Cahill et al. |
| 5,963,926 A | 10/1999 | Kumomura |
| 6,003,019 A | 12/1999 | Eaton et al. |
| 6,009,442 A | 12/1999 | Chen et al. |
| 6,012,050 A | 1/2000 | Eaton et al. |
| 6,021,400 A | 2/2000 | Gallacher et al. |
| 6,128,633 A | 10/2000 | Michelman et al. |
| 6,144,380 A | 11/2000 | Shwarts et al. |
| 6,167,370 A | 12/2000 | Tsourikov |
| 6,173,285 B1 | 1/2001 | Nishita et al. |
| 6,202,052 B1 | 3/2001 | Miller |
| 6,209,095 B1 | 3/2001 | Anderson et al. |
| 6,226,752 B1 | 5/2001 | Gupta et al. |
| 6,237,011 B1 | 5/2001 | Ferguson et al. |
| 6,272,484 B1 | 8/2001 | Martin et al. |
| 6,298,357 B1 | 10/2001 | Wexler et al. |
| 6,311,165 B1 | 10/2001 | Coutts et al. |
| 6,327,574 B1 | 12/2001 | Kramer et al. |
| 6,338,138 B1 | 1/2002 | Raduchel et al. |
| 6,369,811 B1 | 4/2002 | Graham et al. |
| 6,473,741 B1 | 10/2002 | Baker |
| 6,476,930 B1 | 11/2002 | Roberts et al. |
| 6,480,866 B2 | 11/2002 | Mastie |
| 6,510,466 B1 | 1/2003 | Cox et al. |
| 6,539,479 B1 | 3/2003 | Wu |
| 6,567,628 B1 | 5/2003 | Guillemin et al. |
| 6,567,789 B1 | 5/2003 | Baker |
| 6,572,661 B1 | 6/2003 | Stern |
| 6,584,505 B1 | 6/2003 | Howard et al. |
| 6,598,023 B1 | 7/2003 | Drummond et al. |
| 6,601,173 B1 | 7/2003 | Mohler |
| 6,658,464 B2 | 12/2003 | Reisman |
| 6,721,783 B1 | 4/2004 | Blossman et al. |
| 6,912,508 B1 | 6/2005 | McCalden et al. |
| 6,957,384 B2 | 10/2005 | Jeffery et al. |
| 7,013,045 B2 | 3/2006 | Sommer et al. |
| 7,155,404 B1 | 12/2006 | Johnson et al. |
| 7,171,615 B2 | 1/2007 | Jensen et al. |
| 7,234,103 B1 | 6/2007 | Regan |
| 7,257,553 B1 | 8/2007 | Baker |
| 7,529,408 B2 | 5/2009 | Vohariwatt et al. |
| 7,565,312 B1 | 7/2009 | Shaw et al. |
| 7,570,842 B2 | 8/2009 | Suenaga et al. |
| 7,584,884 B2 | 9/2009 | Fox et al. |
| 7,590,572 B2 | 9/2009 | Larson |
| 7,647,258 B2 | 1/2010 | William et al. |
| 7,660,988 B2 | 2/2010 | Carmichael et al. |
| 7,742,958 B1 | 6/2010 | Leek |
| 7,747,484 B2 | 6/2010 | Stanley et al. |
| 7,752,092 B1 | 7/2010 | Mattice |
| 7,836,394 B2 | 11/2010 | Linder |
| 7,840,891 B1 | 11/2010 | Yu et al. |
| 7,853,494 B2 | 12/2010 | Wyle |
| 7,930,226 B1 | 4/2011 | Quinn |
| 7,930,642 B1 | 4/2011 | Gerde |
| 8,050,451 B2 | 11/2011 | Brundage et al. |
| 8,233,751 B2 | 7/2012 | Patel |
| 8,351,703 B2 | 1/2013 | Jain et al. |
| 8,388,440 B2 | 3/2013 | Patterson |
| 8,392,472 B1 | 3/2013 | Gupta et al. |
| 8,417,597 B1 | 4/2013 | McVickar |
| 8,520,885 B2 | 8/2013 | Tanabe |
| 8,606,665 B1 | 12/2013 | Shaw |
| 8,676,689 B1 | 3/2014 | Whelan |
| 9,350,599 B1 | 5/2016 | Enright |
| 9,558,521 B1 | 1/2017 | Eftekhari |
| 9,672,487 B1 | 6/2017 | Garcia |
| 10,210,580 B1 | 2/2019 | Paulus et al. |
| 10,229,314 B1 | 3/2019 | Mitchell |
| RE47,533 E | 7/2019 | Bartlett |
| 10,339,527 B1* | 7/2019 | Coleman .............. G06Q 40/123 |
| 10,482,170 B2 | 11/2019 | Roebuck et al. |
| 10,489,645 B2 | 11/2019 | Wyle |
| 10,592,994 B1 | 3/2020 | Mishra |
| 10,621,678 B1 | 4/2020 | Ramotar |
| 10,664,819 B1 | 5/2020 | Zafar |
| 11,049,235 B2 | 6/2021 | Wheaton et al. |
| 2001/0037268 A1 | 11/2001 | Miller |
| 2001/0044762 A1 | 11/2001 | Nault |
| 2002/0037097 A1 | 3/2002 | Hoyos |
| 2002/0111888 A1 | 8/2002 | Stanley et al. |
| 2002/0133410 A1 | 9/2002 | Hermreck et al. |
| 2002/0161698 A1 | 10/2002 | Wical |
| 2002/0161796 A1 | 10/2002 | Sylthe |
| 2002/0184125 A1 | 12/2002 | Cirulli et al. |
| 2003/0036912 A1 | 2/2003 | Sobotta et al. |
| 2003/0046112 A1 | 3/2003 | Dutta |
| 2003/0061131 A1 | 3/2003 | Parkan, Jr. |
| 2003/0163547 A1 | 8/2003 | Beisty et al. |
| 2003/0231344 A1 | 12/2003 | Fast |
| 2003/0233296 A1 | 12/2003 | Wagner |
| 2004/0024665 A1 | 2/2004 | Foster |
| 2004/0030702 A1 | 2/2004 | Houston |
| 2004/0078271 A1 | 4/2004 | Morano et al. |
| 2004/0088233 A1 | 5/2004 | Brady et al. |
| 2004/0150854 A1 | 8/2004 | Sprague et al. |
| 2004/0216057 A1 | 10/2004 | Wayle et al. |
| 2004/0225581 A1 | 11/2004 | Wyle et al. |
| 2004/0243626 A1 | 12/2004 | Wyle et al. |
| 2005/0038722 A1 | 2/2005 | Throndson et al. |
| 2005/0060234 A1 | 3/2005 | Reahard |
| 2005/0065852 A1 | 3/2005 | Bross et al. |
| 2005/0102283 A1 | 5/2005 | Anderson et al. |
| 2005/0131805 A1 | 6/2005 | Bross |
| 2006/0026083 A1 | 2/2006 | Wyle |
| 2006/0026086 A1 | 2/2006 | Jim |
| 2006/0028520 A1 | 2/2006 | Vonwiller et al. |
| 2006/0107206 A1 | 5/2006 | Koskimies |
| 2006/0155618 A1 | 7/2006 | Wyle |
| 2006/0178961 A1 | 8/2006 | Stanley et al. |
| 2006/0180650 A1 | 8/2006 | Claessens et al. |
| 2006/0271519 A1 | 11/2006 | Blackwood |
| 2007/0033118 A1 | 2/2007 | Hopkinson |
| 2007/0250392 A1 | 10/2007 | Paulsen et al. |
| 2007/0250418 A1 | 10/2007 | Banks et al. |
| 2007/0271249 A1 | 11/2007 | Cragun et al. |
| 2008/0005024 A1 | 1/2008 | Kirkwood |
| 2008/0077503 A1 | 3/2008 | Zias et al. |
| 2008/0082432 A1 | 4/2008 | Baker |
| 2008/0120129 A1 | 5/2008 | Seubert et al. |
| 2008/0147494 A1 | 6/2008 | Larson |
| 2008/0189197 A1 | 8/2008 | Allanson et al. |
| 2008/0228714 A1 | 9/2008 | Prager et al. |
| 2008/0263370 A1 | 10/2008 | Hammoutene |
| 2008/0319882 A1 | 12/2008 | Wyle |
| 2010/0074509 A1 | 3/2010 | Laaser et al. |
| 2010/0161460 A1 | 6/2010 | Vroom et al. |
| 2011/0255789 A1 | 10/2011 | Neogi |
| 2012/0084185 A1 | 4/2012 | Ciaramitaro et al. |
| 2012/0109792 A1* | 5/2012 | Eftekhari .............. G06Q 40/02 |
| | | 726/19 |
| 2012/0173655 A1 | 7/2012 | McEntee |
| 2012/0219175 A1 | 8/2012 | Richardson et al. |
| 2012/0331005 A1* | 12/2012 | White ..................... G06F 16/93 |
| | | 707/781 |
| 2013/0103729 A1 | 4/2013 | Cooney et al. |
| 2013/0204840 A1 | 8/2013 | Jarvis et al. |
| 2014/0161365 A1 | 6/2014 | Acharya |
| 2014/0172656 A1* | 6/2014 | Shaw ..................... G06Q 40/123 |
| | | 705/31 |
| 2014/0180883 A1* | 6/2014 | Regan .................. G06Q 40/123 |
| | | 705/31 |
| 2014/0201126 A1 | 7/2014 | Zadeh et al. |
| 2014/0214758 A1 | 7/2014 | Tripathi et al. |
| 2015/0178856 A1 | 6/2015 | Flores |
| 2015/0205921 A1 | 7/2015 | Dick |
| 2016/0055376 A1 | 2/2016 | Koduru |
| 2016/0328438 A1 | 11/2016 | Bacalzo |
| 2017/0011051 A1 | 1/2017 | Specht |

(56) References Cited

U.S. PATENT DOCUMENTS

| | | |
|---|---|---|
| 2017/0178199 A1 | 6/2017 | Cessna |
| 2017/0279733 A1 | 9/2017 | Marshall |
| 2017/0286414 A1 | 10/2017 | Roebuck |
| 2018/0018312 A1 | 1/2018 | Guzman et al. |
| 2018/0033092 A1 | 2/2018 | Wang et al. |
| 2018/0113945 A1 | 4/2018 | Dhillon |
| 2019/0114313 A1 | 4/2019 | Roebuck |
| 2019/0172153 A1 | 6/2019 | Wyle et al. |
| 2019/0320113 A1 | 10/2019 | Rajvanshi et al. |
| 2020/0065218 A1 | 2/2020 | Bhosale et al. |
| 2020/0233938 A1 | 7/2020 | Sirianni |
| 2020/0236224 A1 | 7/2020 | Harbinson et al. |
| 2021/0090174 A1 | 3/2021 | Altfest et al. |
| 2021/0124919 A1 | 4/2021 | Balakrishnan et al. |

OTHER PUBLICATIONS

USPTO; Corrected Notice of Allowance dated Jun. 20, 2023 in U.S. Appl. No. 17/557,574.
USPTO; Notice of Allowance dated Aug. 9, 2023 in U.S. Appl. No. 17/217,917.
USPTO; Corrected Notice of Allowance dated Aug. 22, 2023 in U.S. Appl. No. 17/217,917.
USPTO; Corrected Notice of Allowance dated Aug. 30, 2023 in U.S. Appl. No. 17/217,917.
USPTO; Non-Final Office Action dated Feb. 21, 2018 in U.S. Appl. No. 15/832,587.
USPTO; Final Office Action dated Aug. 6, 2018 in U.S. Appl. No. 15/832,587.
USPTO; Non-Final Office Action dated Apr. 10, 2019 in U.S. Appl. No. 15/832,587.
USPTO; Final Office Action dated Sep. 11, 2019 in U.S. Appl. No. 15/832,587.
USPTO; Restriction Requirement dated Oct. 2, 2019 in U.S. Appl. No. 15/832,625.
USPTO; Non-Final Office Action dated Nov. 4, 2019 in U.S. Appl. No. 15/832,649.
USPTO; Non-Final Office Action dated Nov. 18, 2019 in U.S. Appl. No. 15/832,640.
USPTO; Non-Final Office Action dated Mar. 12, 2020 in U.S. Appl. No. 15/832,587.
USPTO; Non-Final Office Action dated Feb. 19, 2020 in U.S. Appl. No. 15/832,625.
USPTO; Final Office Action dated Mar. 17, 2020 in U.S. Appl. No. 15/832,649.
USPTO; Final Office Action dated May 29, 2020 in U.S. Appl. No. 15/832,640.
USPTO; Final Office Action dated Jul. 24, 2020 in U.S. Appl. No. 15/832,625.
USPTO; Non-Final Office Action dated Aug. 19, 2020 in U.S. Appl. No. 15/832,625.
USPTO; Final Office Action dated Sep. 29, 2020 in U.S. Appl. No. 15/832,587.
USPTO; Advisory Action dated Oct. 26, 2020 in U.S. Appl. No. 15/832,587.
USPTO; Final Office Action dated Nov. 16, 2020 in U.S. Appl. No. 15/832,625.
USPTO; Non-Final Office Action dated Jan. 1, 2021 in U.S. Appl. No. 15/832,587.
USPTO; Non-Final Office Action dated Jan. 4, 2021 in U.S. Appl. No. 15/832,640.
USPTO; Advisory Action dated Jan. 14, 2021 in U.S. Appl. No. 15/832,625.
USPTO; Non-Final Office Action dated Feb. 3, 2021 in U.S. Appl. No. 15/832,649.
USPTO; Non-Final Action dated Feb. 25, 2021 in U.S. Appl. No. 15/832,625.
USPTO; Final Office Action dated May 25, 2021 in U.S. Appl. No. 15/832,587.
USPTO; Final Office Action dated Jun. 7, 2021 in U.S. Appl. No. 15/832,640.
USPTO; Advisory Action dated Jun. 8, 2021 in U.S. Appl. No. 15/832,587.
USPTO; Final Office Action dated Jun. 15, 2021 in U.S. Appl. No. 15/832,649.
USPTO; Advisory Action dated Jul. 15, 2021 in U.S. Appl. No. 15/832,640.
USPTO; Non-Final Action dated Jul. 23, 2021 in U.S. Appl. No. 16/659,193.
USPTO; Final Action dated Jul. 26, 2021 in U.S. Appl. No. 15/832,625.
Uspto, Advisory Action dated Sep. 3, 2021 in U.S. Appl. No. 15/832,649.
Uspto, Notice of Allowance dated Sep. 13, 2021 in U.S. Appl. No. 16/659,193.
David Wyle, "Automating Tax Preparation With OCR Technology", https://www.aicpastore.com/Content/media/PRODUCER_CONTENT/Newsletters/Articles_2007/CPA/June/OCR_Technology.jsp, Jul. 16, 2007 (Year: 2007), pp. 1-7.
LPL Financial, "LPL Financial Turbotax 2015 User Guide", www.lplfinancial.com, 2015 (Year: 2015), pp. 1-17.
IRS, "Get PriorYearTax Information from the IRS", https://www.irs.gov/newsroom/get-prior-year-tax-information-from-the-irs, Mar. 1, 2017 (Year: 2017), pp. 1-2.
Rouse, Margaret, "What is Metadata", WhatIs.com, https://whatis.techtarget.com/definition/metadata, TechTarget, Nov. 23, 2017 (Year: 2017), pp. 1-2.
USPTO, Non-Final Office Action dated Sep. 28, 2021 in U.S. Appl. No. 15/832,640.
USPTO, Non-Final Office Action dated Oct. 1, 2021 in U.S. Appl. No. 15/832,625.
USPTO, Non-Final Office Action dated Oct. 10, 2021 in U.S. Appl. No. 15/832,649.
USPTO; Non-Final Action dated Nov. 15, 2021 in U.S. Appl. No. 15/832,587.
IntelliTax for Windows and DOS, Accounting Technology, v 18, n 9, p. 38, Oct. 2002.
Cia, Patricia. Managing Your Bookmarks & Favorites, Feb. 25, 1999, SLA, 2 pages.
Harvey, Greg. Adobe Acrobat 5 PDF For Dummies, 2002, Wiley Publishing Inc., pp. 13-34.
MSPivot, Microsoft Office Excel PivotTable Reports 101, downloaded on Sep. 14, 2008 from http://office.microsoft.com/em-us/excel/HAOI0346321033.aspx?ac=, 12 pages.
SurePrep introduces Tax prep Workflow System, Anonymous, CPA technology Advisor, Ft. Atkinson, Jun./Jul. 2005, vol. 15, Issue 3, 1 page.
Missing Links: an insider's view, Dauphinais G. Williams, PC Magazine, vol. 6, No. 15, 24 pages.
Ted Needleman, Accounting Today, New York, Aug. 1998, vol. 12, Iss. 14, p. 24, 4 pgs.
USPTO, Restriction/Election Requirement dated Jan. 17, 2007 in U.S. Appl. No. 10/422,133.
USPTO, Non-Final Office Action dated Apr. 17, 2007 in U.S. Appl. No. 10/422,133.
USPTO, Final Office Action dated Sep. 4, 2007 in U.S. Appl. No. 10/422,133.
USPTO, Non-Final Office Action dated Nov. 14, 2007 in U.S. Appl. No. 10/422,133.
USPTO, Final Office Action dated Jun. 9, 2008 in U.S. Appl. No. 10/422,133.
USPTO, Restriction/Election Requirement dated Oct. 2, 2008 in U.S. Appl. No. 10/422,133.
USPTO, Non-Final Office Action dated May 19, 2009 in U.S. Appl. No. 10/422,133.
USPTO, Notice of Allowance dated Sep. 15, 2009 in U.S. Appl. No. 10/422,133.
USPTO, Supplemental Notice of Allowance dated Nov. 9, 2009 in U.S. Appl. No. 10/422,133.
USPTO, Non-Final Office Action dated Sep. 14, 2007 in U.S. Appl. No. 10/430,830.

(56) References Cited

OTHER PUBLICATIONS

USPTO, Final Office Action dated Jan. 8, 2008 in U.S. Appl. No. 10/430,830.
USPTO, Non-Final Office Action dated Jan. 13, 2009 in U.S. Appl. No. 10/430,830.
USPTO, Non-Final Office Action dated Jun. 25, 2009 in U.S. Appl. No. 10/430,830.
USPTO, Notice of Allowance dated Sep. 30, 2009 in U.S. Appl. No. 10/430,830.
USPTO, Non-Final Office Action dated Nov. 9, 2011 in U.S. Appl. No. 12/510,179.
USPTO, Non-Final Office Action dated Apr. 9, 2012 in U.S. Appl. No. 12/510,179.
USPTO, Notice of Allowance dated Sep. 12, 2012 in U.S. Appl. No. 12/510,179.
USPTO, Non-Final Office Action dated Feb. 25, 2008 in U.S. Appl. No. 10/448,483.
USPTO, Notice of Allowance dated Sep. 22, 2008 in U.S. Appl. No. 10/448,483.
USPTO, Restriction/Election Requirement dated Aug. 28, 2008 in U.S. Appl. No. 11/031,060.
USPTO, Non-Final Office Action dated Nov. 12, 2008 in U.S. Appl. No. 11/031,060.
USPTO, Final Office Action dated Jun. 24, 2009 in U.S. Appl. No. 11/031,060.
USPTO, Non-Final Office Action dated Oct. 27, 2009 in U.S. Appl. No. 11/031,060.
USPTO, Final Office Action dated May 3, 2010 in U.S. Appl. No. 11/031,060.
USPTO, Notice of Allowance dated Oct. 6, 2010 in U.S. Appl. No. 11/031,060.
USPTO, Non-Final Office Action dated Apr. 11, 2008 in U.S. Appl. No. 10/903,637.
USPTO, Final Office Action dated Oct. 1, 2008 in U.S. Appl. No. 10/903,637.
USPTO, Non-Final Office Action dated Mar. 16, 2009 in U.S. Appl. No. 10/903,637.
USPTO, Notice of Allowance dated Sep. 4, 2009 in U.S. Appl. No. 10/903,637.
USPTO, Non-Final Office Action dated Nov. 24, 2008 in U.S. Appl. No. 11/766,019.
USPTO, Non-Final Office Action dated May 27, 2009 in U.S. Appl. No. 11/766,019.
USPTO, Final Office Action dated Nov. 5, 2009 in U.S. Appl. No. 11/766,019.
USPTO, Notice of Allowance dated May 5, 2010 in U.S. Appl. No. 11/766,019.
USPTO, Non-Final Office Action dated Jun. 12, 2013 in U.S. Appl. No. 13/155,195.
USPTO, Final Office Action dated Jan. 16, 2014 in U.S. Appl. No. 13/155,195.
USPTO, Notice of Allowance dated Apr. 25, 2014 in U.S. Appl. No. 13/155,195.
USPTO, Non-Final Office Action dated May 23, 2016 in U.S. Appl. No. 14/325,207.
USPTO, Final Office Action dated Dec. 23, 2016 in U.S. Appl. No. 14/325,207.
USPTO, Non-Final Office Action dated Sep. 5, 2017 in U.S. Appl. No. 14/325,207.
USPTO, Notice of Allowance dated Apr. 27, 2018 in U.S. Appl. No. 14/325,207.
USPTO, Non-Final Office Action dated Mar. 28, 2013 in U.S. Appl. No. 13/243,774.
USPTO, Non-Final Office Action dated Oct. 23, 2013 in U.S. Appl. No. 13/243,774.
USPTO, Notice of Allowance dated Mar. 31, 2014 in U.S. Appl. No. 13/243,774.
USPTO, Notice of Allowance dated Oct. 29, 2013 in U.S. Appl. No. 13/542,345.
USPTO, Notice of Allowance dated Aug. 19, 2019 in U.S. Appl. No. 15/922,821.
USPTO, Corrected Notice of Allowance dated Aug. 28, 2019 in U.S. Appl. No. 15/922,821.
USPTO, Notice of Allowance dated Aug. 14, 2019 in U.S. Appl. No. 16/047,346.
USPTO, Restriction/Election Requirement dated Dec. 21, 2015 in U.S. Appl. No. 12/557,473.
USPTO, Non-Final Office Action dated Oct. 25, 2012 in U.S. Appl. No. 12/557,473.
USPTO, Non-Final Office Action dated Jun. 19, 2013 in U.S. Appl. No. 12/557,473.
USPTO, Non-Final Office Action dated Oct. 23, 2014 in U.S. Appl. No. 12/557,473.
USPTO, Non-Final Office Action dated Jun. 2, 2016 in U.S. Appl. No. 12/557,473.
USPTO, Final Office Action dated Dec. 31, 2013 in U.S. Appl. No. 12/557,473.
USPTO, Final Office Action dated May 22, 2015 in U.S. Appl. No. 12/557,473.
USPTO, Notice of Allowance dated Jun. 6, 2014 in U.S. Appl. No. 12/557,473.
International Searching Authority, International Written Opinion dated Oct. 26, 2006 in Application No. PCT/US2005/25711.
International Searching Authority, International Preliminary Report on Patentability dated Jan. 30, 20007 in Application No. PCT/US2005/25711.
International Searching Authority, International Preliminary Report on Patentability dated Jan. 30, 20007 in Application No. PCT/US2005/046397.
International Searching Authority, International Written Opinion dated Jul. 23, 2007 in Application No. PCT/US2005/046397.
USPTO, Final Office Action dated Dec. 15, 2021 in U.S. Appl. No. 15/832,625.
USPTO, Notice of Allowance dated Dec. 16, 2021 in U.S. Appl. No. 15/832,640.
Peasron, "Grouping and Filtering with Metadata" Managing Files and Searching in Windows 8.1. Informit. Apr. 7, 2014; <https://www.informit.com/articles/article.aspx?p=2186997 &seq Num=5> (Year: 2014), 2 pages.
Brian Tankersley, "Tax Document Automation Tools Come of Age", www.CPAPracticeAdviser.com, Jul. 2011 (Year: 2011), pp. 21-23.
USPTO, Notice of Allowance dated Mar. 18, 2022, in U.S. Appl. No. 15/832,587.
USPTO; Advisory Action dated Feb. 24, 2022 in U.S. Appl. No. 15/832,625.
USPTO, Supplemental Notice of Allowance dated Dec. 30, 2021 in U.S. Appl. No. 15/832,640.
USPTO; Advisory Action dated May 9, 2022 in U.S. Appl. No. 15/832,649.
USPTO; Office Action dated Dec. 5, 2017 in U.S. Appl. No. 15/832,649.
USPTO, Corrected Notice of Allowability dated Dec. 7, 2022 in U.S. Appl. No. 15/832,649.
USPTO, Notice of Allowance dated Nov. 17, 2022 in U.S. Appl. No. 15/832,649.
USPTO, Non-Final Office Action dated Mar. 2, 2023 in U.S. Appl. No. 17/217,917.

* cited by examiner

TAXPAYERS SWITCHING TAX PREPARERS

CROSS-REFERENCE TO RELATED APPLICATIONS

This application is a continuation of, claims priority to and the benefit of, U.S. patent application Ser. No. 17/557,574, filed Dec. 21, 2021 and entitled "TAXPAYERS SWITCHING TAX PREPARERS." The '574 application is a continuation of, claims priority to and the benefit of, U.S. patent application Ser. No. 15/832,640, filed Dec. 5, 2017 and entitled "AUTOMATIC DOCUMENT ANALYSIS FILTERING, AND MATCHING SYSTEM" (nka U.S. Pat. No. 11,238,540 issued on Feb. 1, 2022). Both are hereby incorporated by reference in their entirety for all purposes.

BACKGROUND

1. Field

This specification relates to a system and a method for automatically accessing, analyzing, and storing documents from a server.

2. Description of the Related Art

A certified public accountant may be hired by a taxpayer to prepare and file tax returns on the taxpayer's behalf. Conventionally, these taxpayers collect various tax related documents throughout the year and give them to their tax preparer at one time, when the tax return filing deadline approaches. The transmission of tax documents from the taxpayer client to the tax preparer may be conducted either using physical papers or electronically via a graphical user interface provided by the tax preparer.

However, this approach has many drawbacks. The taxpayer may not promptly provide tax documents to the tax preparer. The taxpayer may be over-inclusive in providing documents to the tax preparer, and may mistakenly include documents unrelated to the preparation of the tax return. Alternatively, the taxpayer may be under-inclusive in providing documents to the tax preparer, and mistakenly leave out tax documents required for preparing the tax return. The tax preparer may spend valuable time and resources in order to sort through the various documents provided by the taxpayer.

SUMMARY

What is described is a method for automatically obtaining tax documents. The method includes automatically identifying, by a server, one or more tax return items associated with the taxpayer by analyzing a prior year tax return. The method also includes generating, by the server, a list of tax return items associated with the taxpayer, the list of tax return items including the automatically identified one or more tax return items associated with the taxpayer, and each tax return item from the list of tax return items having a corresponding tax document to be used to prepare a tax return for the taxpayer. The method also includes receiving, by the server from a taxpayer client device, user authentication information for the taxpayer for a third party database. The method also includes accessing, by the server, the third party database using the user authentication information for the taxpayer. The method also includes receiving, by the server, a document from the third party database. The method also includes automatically determining, by the server, whether the document corresponds to one of the tax return items from the list of tax return items associated with the taxpayer. The method also includes automatically storing, by the server, the document when the document corresponds to one of the tax return items from the list of tax return items associated with the taxpayer.

Also described is a system for automatically obtaining tax documents. The system includes a taxpayer client device configured to provide a prior year tax return. The system also includes a server. The server is configured to receive, from the taxpayer client device, the prior year tax return. The server is also configured to automatically identify one or more tax return items associated with the taxpayer by analyzing the prior year tax return. The server is also configured to generate a list of tax return items associated with the taxpayer, the list of tax return items including the automatically identified one or more tax return items associated with the taxpayer, and each account from the list of tax return items having a corresponding tax document to be used to prepare a tax return for the taxpayer. The server is also configured to receive, from the taxpayer client device, user authentication information for the taxpayer for a third party database. The server is also configured to access the third party database using the user authentication information for the taxpayer. The server is also configured to receive a document from the third party database. The server is also configured to automatically determine whether the document corresponds to one of the tax return items from the list of tax return items associated with the taxpayer. The server is also configured to automatically store the document when the document corresponds to one of the tax return items from the list of tax return items associated with the taxpayer.

Also described is a server of a system for automatically obtaining tax documents. The server includes a memory configured to store a prior year tax return received from a taxpayer client device. The server also includes a processor. The processor is configured to automatically identify one or more tax return items associated with the taxpayer by analyzing the prior year tax return. The processor is also configured to generate a list of tax return items associated with the taxpayer, the list of tax return items including the automatically identified one or more tax return items associated with the taxpayer, and each tax return item from the list of tax return items having a corresponding tax document to be used to prepare a tax return for the taxpayer. The processor is also configured to receive, from the taxpayer client device, user authentication information for the taxpayer for a third party database. The processor is also configured to access the third party database using the user authentication information for the taxpayer. The processor is also configured to receive a document from the third party database. The processor is also configured to automatically determine whether the document corresponds to one of the tax return items from the list of tax return items associated with the taxpayer. The processor is also configured to automatically store the document when the document corresponds to one of the tax return items from the list of tax return items associated with the taxpayer.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1A:
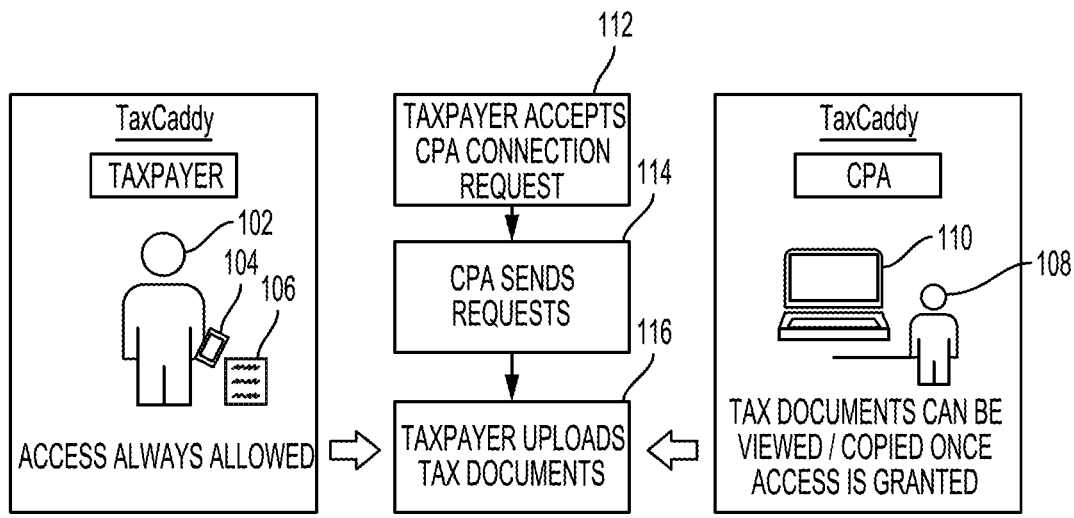
FIGS. 1A-1B illustrate an example situation using the system, according to an aspect of the invention.

Disclosed herein are systems, vehicles, and methods for automatically assembling, gathering, processing, and storing tax documents. Conventionally, taxpayers collect various tax related documents throughout the year and give them to their tax preparer at one time, when the tax return filing deadline approaches. The transmission of tax documents from the taxpayer client to the tax preparer may be conducted either using physical papers or electronically via a graphical user interface provided by the tax preparer.

However, these various tax documents may be misplaced or misclassified by either the taxpayer or the tax preparer. In addition, the tax return filing deadline is a common deadline for many taxpayers, so the tax preparer may be inundated with countless tax related documents from various taxpayer clients. Further, if a relationship between a taxpayer client and a tax preparer is terminated, the taxpayer client may not have access to the tax related documents the taxpayer client previously provided to the tax preparer, and significant efforts on the part of the taxpayer client may be required to obtain and provide those tax related documents to a new tax preparer.

The systems and methods described herein allow taxpayer clients to securely provide tax documents to a system periodically throughout the year, and the tax documents are owned by the taxpayer client, who is able to access them at any time. When the tax preparer is ready to begin working on the tax return for the taxpayer, the tax preparer can access the stored tax documents. This is an improvement over conventional systems, which rely on the taxpayer client and/or the tax preparer to keep track of paper and/or digital copies of tax documents throughout the year. In some situations, taxpayer clients do not provide tax documents to their tax preparer continuously throughout the year, as the tax preparer may lose track of the tax documents, and it may be burdensome for the tax preparer to classify and file away each tax document for their numerous clients. In other situations, taxpayer clients do continuously provide tax documents to their tax preparer, but it is burdensome to the tax preparer to maintain and organize the various documents from their various taxpaying clients. Both situations result in the potential for errors and inaccuracy when preparing tax documents. In addition, in conventional systems, if the taxpayer client decides to hire a different tax preparer, re-obtaining the tax documents from the original tax preparer may be difficult.

The systems and methods described herein also allow the tax preparer to avoid being inundated with tax documents at an inconvenient time as the tax return filing deadline imminently approaches. In addition, taxpayer clients typically submit all documents to the tax preparer at once, and other documents, such as signed engagement letters and completed questionnaires may be held by the taxpayer client until the taxpayer client is ready to send all of the gathered documents. This holding of documents may create further delays for the tax preparer and the companies the tax preparer works for in receiving information and signed agreements, such as engagement letters.

The software associated with the automated tax document assembly, gathering, processing, and storage system may be denoted in the figures as TaxCaddy.

FIG. 1A illustrates an example scenario for the system. The taxpayer 102 is an individual who will have a tax return prepared by the tax preparer 108. The taxpayer 102 has a client device 104, which may be a smartphone, a personal computer, or other computing device. The taxpayer 102 may use the client device 104 to access and interact with a server. The client device 104 may be configured to display a graphical user interface to facilitate receiving data from the taxpayer 102 and displaying data to the taxpayer 102. The data may include information input by the taxpayer 102 in response to a questionnaire provided by the tax preparer 108, or may be a tax document. The tax document may be provided by the taxpayer 102 using a camera or scanner of the client device 104. The camera or scanner of the client device 104 is configured to detect image data representing the tax document 106.

The tax preparer 108 may use a client device 110 to access and interact with the server. The client device 110 may be configured to display a graphical user interface to facilitate interactions with the tax preparer 108.

In some embodiments, the tax preparer 108 communicates a connection request to the taxpayer 102. The connection request communication may be facilitated using the respective graphical user interfaces provided by the client devices 104 and 110. The taxpayer 102 may accept the connection request from the tax preparer 108 (step 112). In some embodiments, once the connection request is accepted by the taxpayer 102, the tax preparer 108 is able to view any tax related documents or information associated with the taxpayer 102.

The tax preparer 108 communicates a request to the taxpayer 102 for documents, such as signed engagement letters and taxpayer questionnaires (step 114). The taxpayer 102 may provide the corresponding materials in response to the request using the graphical user interface provided by the client device 104. In some embodiments, a prior year tax return of the taxpayer 102 is automatically analyzed by the system and a list of tax return items are detected. A tax return item may be any income, expense, deduction, or credit associated with the taxpayer 102. In some embodiments, the prior year tax return is provided by a tax return preparation system. In some embodiments, the data of the prior year tax return is provided by the tax return preparation system, and the system may not need to analyze the prior year tax return to determine the list of tax return items.

The list of tax return items may be displayed by the graphical user interface on the taxpayer client device 104.

The displayed list of tax return items may serve as a checklist for the taxpayer 102 when the taxpayer 102 is gathering documents for the taxpayer's tax return. For example, the taxpayer's prior year tax return may indicate the taxpayer 102 had three tax return items: a brokerage account from Brokerage A, an interest bearing savings account from Bank B, and a mortgage with Lender C. For the current year's tax return, if these accounts are still active, a tax document corresponding with each of these tax return items should be provided to the system in order to prepare the tax return.

The taxpayer 102 may upload tax documents using the client device 104, as described herein (step 116). The uploaded tax documents may be securely stored by the server. One or more security measures may be taken in order to improve the security of the tax document, such as encryption or password protection. Once the taxpayer 102 uploads the tax documents to the server, the tax preparer 108 is able to view or copy the tax documents, provided the taxpayer 102 has granted access to the tax preparer 108.

Figure 1B:
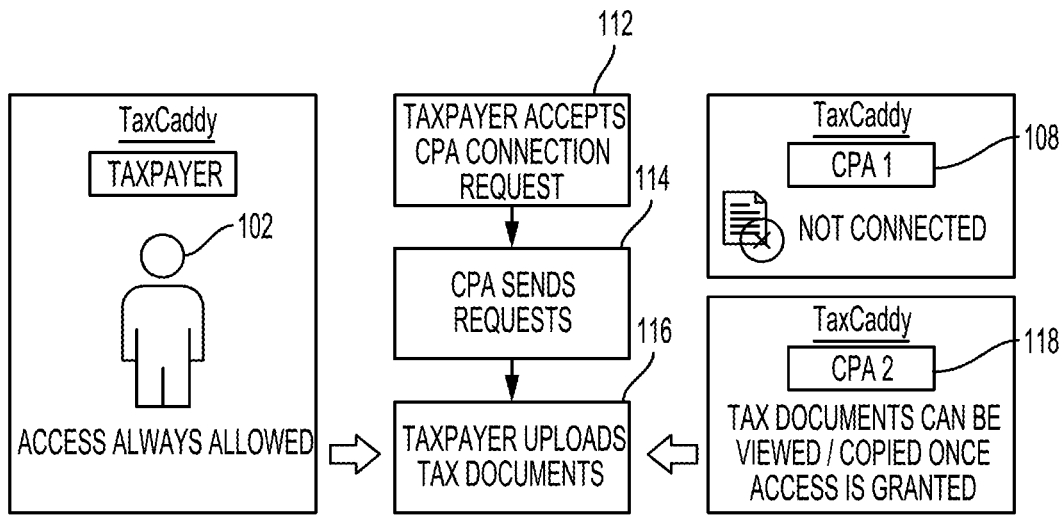

As illustrated in FIG. 1B, the relationship between the taxpayer 102 and the original tax preparer 108 may be terminated, and a new tax preparer 118 may be connected with the taxpayer 102. The termination may occur either before or after this year's tax return is filed. The new tax preparer 118 does not need to be re-sent the tax documents the taxpayer 102 already uploaded, as would have been the case with conventional systems, as the uploaded tax documents are already securely stored on the server. The new tax preparer 118 is able to access the tax documents of the taxpayer 102 when the taxpayer 102 grants the new tax preparer 118 access. The previous tax preparer 108 no longer has access to the tax documents of the taxpayer 102.

Importantly, the taxpayer 102 retains access to previously uploaded tax documents. In conventional systems, when an online portal provided by the tax preparer 108 is used to upload tax documents and the taxpayer 102 discontinues the relationship with the tax preparer 108, the tax preparer 108 maintains access to the uploaded tax documents and the taxpayer 102 no longer has access. This is a significant shortcoming of conventional computer-implemented tax preparation systems, and is addressed by the system. Conventional computer-implemented tax preparation technology does not allow uploaded tax documents to be controlled by the taxpayer 102. This is a problem unique to computer-implemented tax preparation technology, which is overcome by the system.

In some situations, the tax preparer 108 may terminate the association between the tax preparer 108 and the taxpayer 102. In these situations, the tax preparer 108 may communicate to the server (via the graphical user interface of the tax preparer client device 110), an indication to remove the association between the tax preparer 108 and the taxpayer 102. As a result, the tax preparer 108 would be unable to have access to the tax documents associated with the taxpayer 102 that are stored on the server. In some embodiments, the tax preparer 108 and/or the taxpayer 102 may unilaterally remove the association between the tax preparer 108 and the taxpayer 102. In some embodiments, both parties must approve of the removal of association between the two parties.

Figure 2:
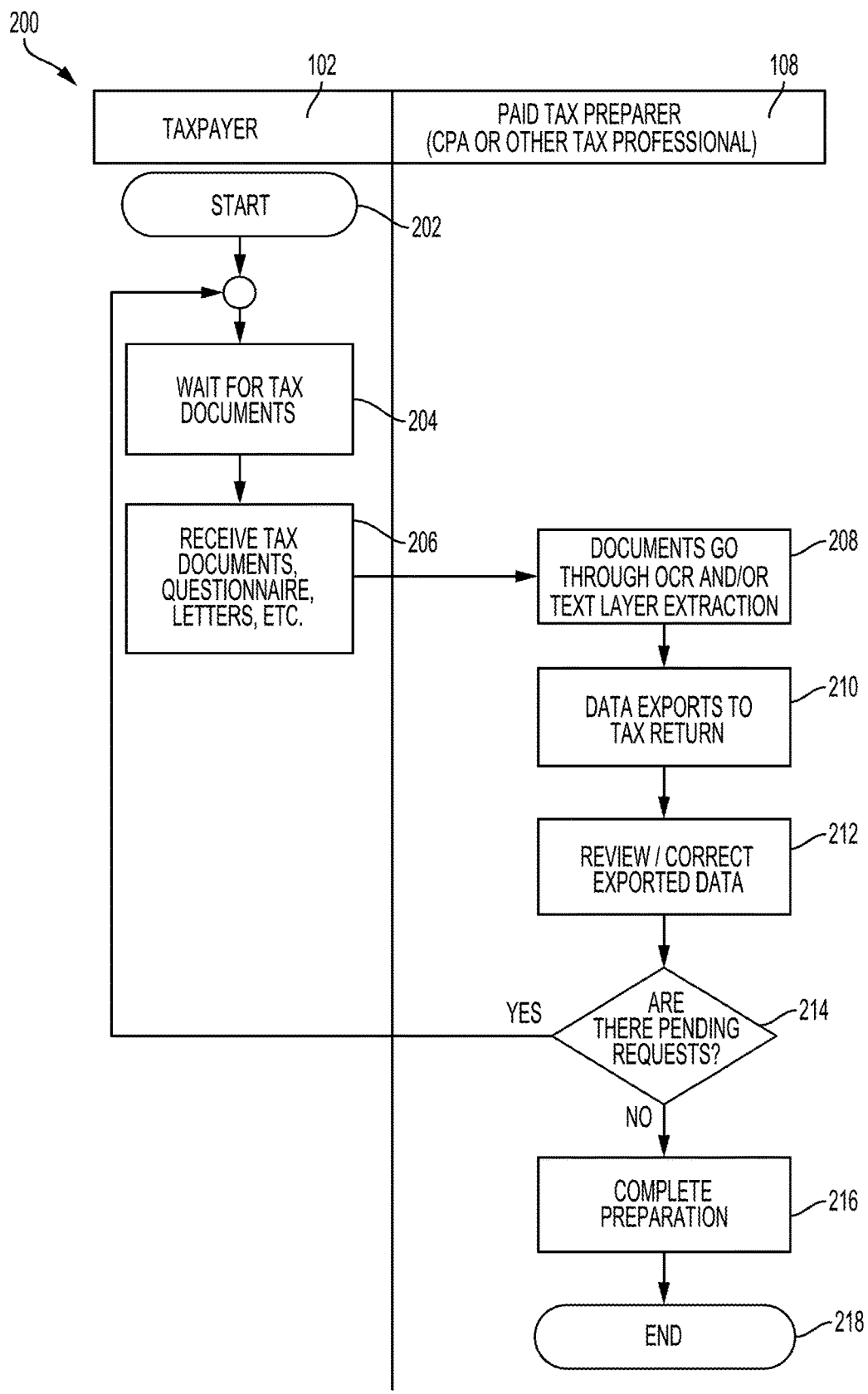
FIG. 2 illustrates a flow diagram of a process of the system, according to various embodiments of the invention.

FIG. 2 illustrates a flow diagram of a process 200 of the system. The process 200 begins when the taxpayer 102 and the tax preparer 108 are connected (step 202). In some embodiments, the taxpayer 102 and the tax preparer 108 may be connected when an identifier corresponding to the taxpayer 102 is associated with an identifier corresponding to the tax preparer 108. This association may be stored in a server.

The system waits for the taxpayer 102 to upload tax documents (e.g., tax document 106). The tax documents may be tax documents issued by an employer or payroll administrator of the taxpayer 102, such as a W-2, or may be account statements of a brokerage account associated with the taxpayer 102, or may be account statements of a bank account associated with the taxpayer 102, or may be receipts of tax deductible donations made by the taxpayer 102.

The taxpayer 102 uploads tax documents to the system (step 206). The taxpayer 102 may sign an agreement or complete a questionnaire provided by the tax preparer 108, via their client device and graphical user interface, as described herein. Alternatively, the taxpayer 102 may also upload any signed agreements between the taxpayer 102 and the tax preparer 108 or completed questionnaires issued by the tax preparer 108 for the taxpayer 102 to complete. These documents may be provided to the system via the client device 104. In some embodiments, the client device 104 is a smartphone, and the taxpayer 102 takes one or more photos of the documents using a camera of the smartphone and uploads the one or more photos. In some embodiments, the client device 104 is a personal computer connected to a scanner, and the taxpayer 102 scans the documents and uploads the scans of the documents. When the documents are uploaded to the system, the client device 104 may send the document data to the server of the system.

The documents are analyzed using optical character recognition and/or text layer extraction (step 208). Optical character recognition and/or text layer extraction detects the information on the documents and allows the information to be extracted as tax document data. In some embodiments, the server performs the analysis using optical character recognition and/or text layer extraction.

The tax document data is automatically exported to a tax return or other tax form (step 210). The server may detect a type of data for each piece of data in the tax document data, and the server may automatically populate the corresponding field of the tax return or other tax form using the detected tax document data. For example, a W-2 may be analyzed using optical character recognition and/or text layer extraction, and tax document data is detected. Within the tax document data, a value of $80,000 may be detected as corresponding to the income of the taxpayer, and the value of $80,000 may be automatically populated to the tax return. The server may recognize certain formats of data and/or locations of data within the tax document and/or value ranges when detecting the type of data of each piece of data in the tax document data.

The tax preparer 108 may review and/or correct the data (step 212). In some situations, data from the tax document data may be incorrectly categorized, and the tax preparer 108 may manually adjust the tax return using the client device 110.

It is determined whether there are any pending requests (step 214). In some embodiments, a prior year tax return for the taxpayer 102 is analyzed and a list of tax return items for which tax documents should be provided may be generated. In some embodiments, the prior year tax return is provided by the taxpayer 102. In some embodiments, the prior year tax return is provided by a tax return preparation system. In some embodiments, the data of the prior year tax return is provided by the tax return preparation system, and the system may not need to analyze the prior year tax return to determine the list of tax return items.

The list may be used as the basis for reminding the taxpayer 102 and requesting tax documents from the taxpayer 102. In some embodiments, the tax preparer 108 communicates requests for data to the taxpayer 102. In some embodiments, the tax documents may be retrieved from a third party, such as a bank or brokerage, and not from the taxpayer 102, and the requests for the data are accordingly communicated to the third party. When there are pending requests, a reminder is sent to the appropriate party, and steps 204-212 are repeated. When there are no pending requests, no reminder is sent, and the tax return preparation is completed (step 216) and the process 200 is completed (step 218).

As described herein, the steps of process 200 (namely steps 204-212) may be performed after the taxable year and before the deadline to file tax returns, as the taxpayer 102 or the third party provides the tax documents. This is in contrast to conventional systems, whereby the taxpayer 102 provides the tax documents at one time.

Figure 3:
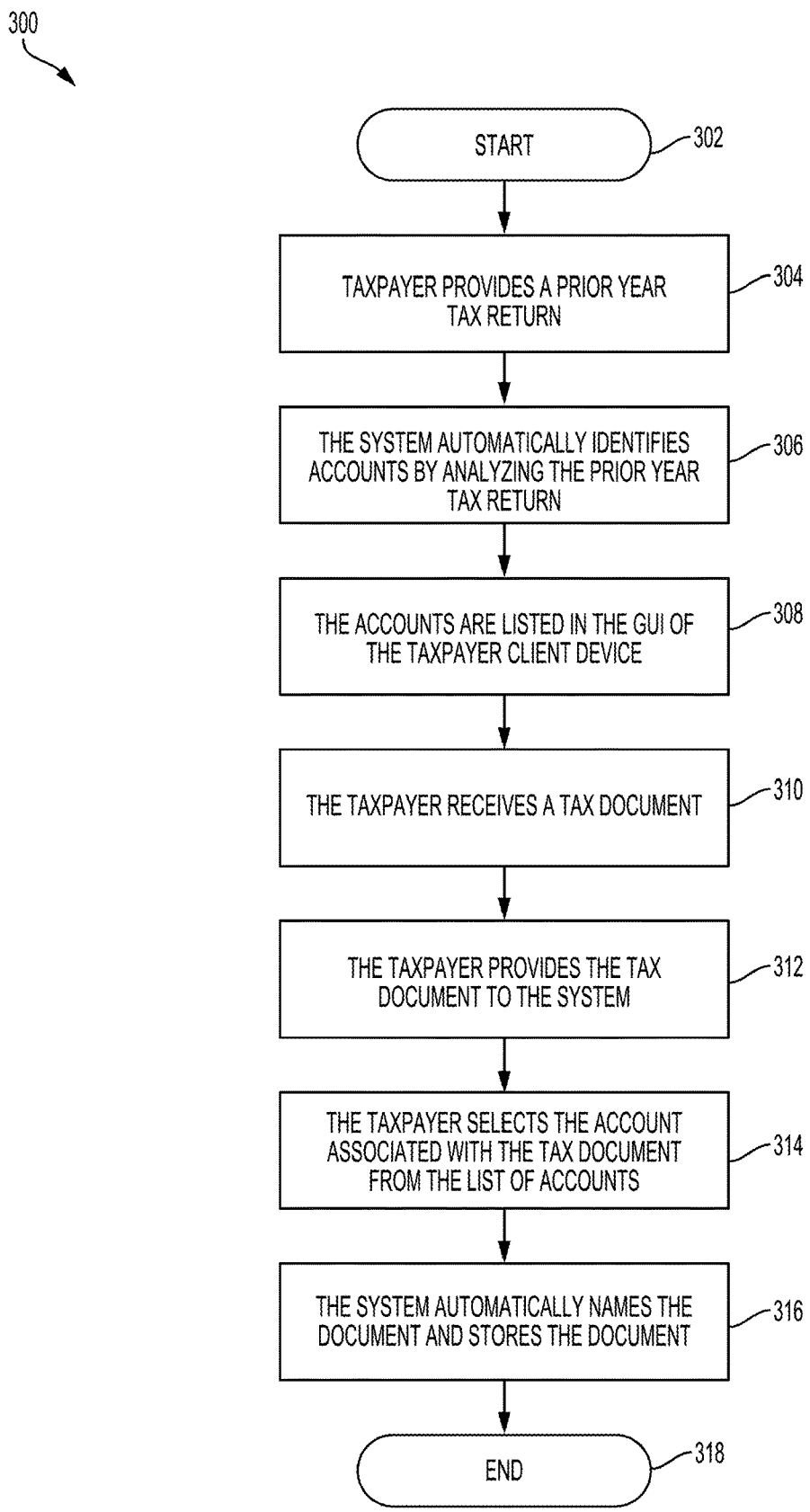
FIG. 3 illustrates a process of the system illustrating a reduction of time spent by the taxpayer in responding to the tax preparer information requests, according to an aspect of the invention.

FIG. 3 illustrates a process 300 of the system illustrating a reduction of time spent by the taxpayer in responding to the tax preparer information requests. The process starts (step 302) and the taxpayer 102 provides a prior year tax return to the system (step 304). The prior year tax return may be provided in an electronic file format, as described herein (e.g., a .pdf file sent by the taxpayer 102 via the taxpayer client device 104 or image data associated with a picture or scan taken of the prior year tax return). In some embodiments, the tax preparer 108 provides the prior year tax return. In some embodiments, the prior year tax return is provided by a tax return preparation system. In some embodiments, the data of the prior year tax return is provided by the tax return preparation system, and the system may not need to analyze the prior year tax return to determine the list of tax return items.

The system automatically identifies tax return items associated with the taxpayer 102 based on the prior year tax return (step 306). For example, the prior year tax return may indicate that the taxpayer 102 has three tax return items: a brokerage account from Brokerage A, an interest bearing savings account from Bank B, and a mortgage with Lender C. Each of these accounts may have activity in the current tax year for which the tax return is being prepared, which may be included in the tax return for the current tax year. The system analyzes the prior year tax return to identify tax return items with Brokerage A, Bank B, and Lender C. The system may automatically apply optical character recognition and/or text layer extraction to the prior year tax return to determine the text contained in the prior year tax return, and the text and location of the text may be automatically analyzed using computer logic programmed into the system to determine that the taxpayer 102 has accounts with Brokerage A, Bank B, and Lender C.

The identified accounts are listed in the graphical user interface of the taxpayer client device 104 (step 308). The list of identified tax return items may serve as a checklist for the taxpayer 102 for gathering and providing documents throughout the year. The graphical user interface may provide a button or icon for the taxpayer 102 to indicate that a particular tax return items is no longer applicable. For example, if the taxpayer 102 closed the taxpayer's brokerage account from Brokerage A, the graphical user interface may include a button labelled "NO LONGER APPLICABLE" for the taxpayer 102 to select to indicate that the brokerage account is no longer active. In another example, if the taxpayer 102 did not make a charitable contribution this year, the taxpayer 102 may indicate, using the graphical user interface, that the tax return item corresponding to the charitable contribution of the previous year is not applicable this year. Tax return items may be grouped and displayed based on tax return item type, institution type, tax return item name, institution name, or by any other sorting criteria.

In some embodiments, additional tax return items which were not included in the automatically generated list may be added by the taxpayer 102 using the taxpayer client device 104. These tax return items may not have been included if there was an error in detecting the tax return items from the prior year tax return or if the tax return item was newly added this current taxable year.

The taxpayer may receive a physical paper tax document or a digital tax document in one of any number of file formats, such as .doc or .pdf (step 310). As described herein, the physical paper document may be scanned or a picture may be taken of the physical paper document.

The tax document is provided to the system (step 312). In some embodiments, providing the tax document to the system includes the taxpayer client device 104 communicating the data associated with the tax document to a server associated with the system. In some embodiments, the client device 104 presents a graphical user interface and the taxpayer 102 identifies the digital tax document to be uploaded to the server of the system by navigating through the graphical user interface.

The taxpayer 102 identifies a tax return item associated with the provided tax document (step 314). For example, if the provided tax document is a tax document provided by a lender with respect to a mortgage, the taxpayer 102 may indicate (via the graphical user interface), that the provided tax document is associated with the tax return item with Lender C. In some embodiments, the indication is made by selecting a check box next to Lender C in a listing of tax return items. In other embodiments, the indication is made by selecting Lender C from a drop-down menu having a listing of tax return items.

The system automatically names the provided tax document and stores the tax document (step 316) and the process 300 ends (step 318). In some embodiments, the data associated with the tax document (e.g., a .pdf file or image data from the camera) is stored in a database of the system and the data is associated with a file name corresponding to the tax return item identified in step 314. The file name may identify various characteristics associated with the tax document, such as the type of tax return item, the entity administering the tax return item, the taxpayer identifier, or the tax year associated with the tax document, for example.

In some embodiments, the tax document is encrypted or otherwise protected to increase the data security before storing the tax document by the system.

When the taxpayer 102 performs the process 300 over the course of the period after the tax year and before the deadline to file the tax return (as opposed to right before the deadline to file the tax return, as is conventionally the case), time and effort may be saved when the tax filing deadline approaches. In addition, the tax preparer 108 may be able to begin working on preparing the tax return using the tax documents uploaded over the course of the year. Questionnaires sent by the tax preparer 108 may be uploaded by the taxpayer 102 after completion, and if the taxpayer 102 switches to a different tax preparer 118, as illustrated in FIG. 1B, the new tax preparer 118 may be able to use the information from the completed questionnaire for the original tax preparer 108, and the taxpayer 102 may not have to complete a second questionnaire from the new tax preparer 118.

In some embodiments, the list of tax return items generated based on the prior year tax return may be used as a checklist in process 200 of FIG. 2 at step 214. The list of tax return items may be used to generate a list of requests which need to be fulfilled with corresponding documents for the current tax year. For example, when the list of tax return items indicates the taxpayer 102 has tax return items for Brokerage A, Bank B, and Lender C, there may be requests generated by the system for each of these tax return items. When a tax document is received by the system corresponding to Brokerage A, the request may be removed from the list. The taxpayer 102 may view the outstanding list of tax return items for which tax documents should be provided (e.g., Bank B and Lender C) in the graphical user interface provided by the taxpayer client device 104. In some embodiments, the system periodically automatically determines which tax documents are outstanding based on the list of tax return items, and sends a reminder to the taxpayer 102 and/or the tax preparer 108. The reminder may be in the form of an automatically generated e-mail, an automatically generated text message, an automatically generated notification which appears on a smartphone application, an automatically generated audible alert played by the smartphone, or any other form of notification.

Figure 4:
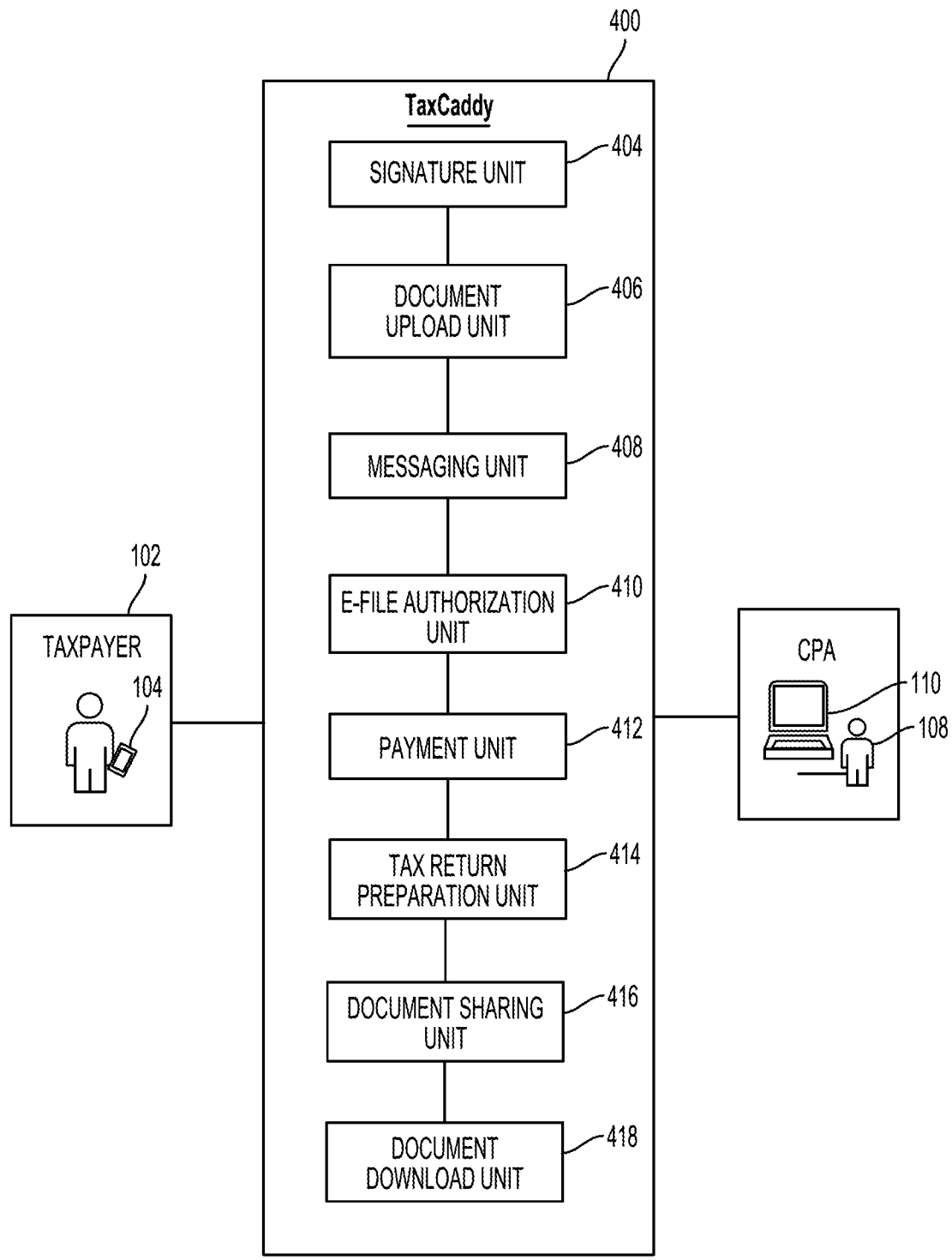
FIG. 4 illustrates features of software associated with the system, according to an embodiment of the invention.

FIG. 4 illustrates features of software associated with the system, which streamlines the entire process of preparing and filing a tax form, such as a tax return. Conventionally, many separate and different applications have been used in the process of preparing and filing a tax return. Form completion software may be used for the taxpayer to fill out a form or questionnaire, an electronic signature service may be used for the taxpayer to electronically sign a prepared form, an online portal may be used for the taxpayer to provide documents to the tax preparer, an electronic messaging system (e.g., text message or email) may be used to communicate between the taxpayer and the tax preparer, E-File Authorization software may be used for the taxpayer to provide authorization to the tax preparer to file on the taxpayer's behalf, and a payment service may be used for the taxpayer to pay the tax preparer for services rendered. These disparate and disconnected collection of software and services requires each party to keep track of numerous login identifiers and passwords, as well as requiring each party to be familiar with the different user interfaces of each. In addition, in these conventional systems, having to log in to various pieces of software discourages taxpayers from timely providing information to the tax preparer and also discourages communication between the taxpayer and the tax preparer.

For example, when a tax preparer would like to remind the taxpayer to upload a particular tax document, the tax preparer logs in to an electronic messaging system, sends a message to the taxpayer, the taxpayer logs in to the electronic messaging system, reads the reminder to upload the tax document, the taxpayer scans the tax document with a scanner and logs in to the online portal of the tax preparer to upload the tax document, the taxpayer then goes back to the electronic messaging system, informs the tax preparer that the tax document has been uploaded. This process involves multiple steps of logging off and on between multiple accounts and multiple services, and at any point, the taxpayer could be discouraged from continuing, knowing that if the taxpayer simply provides the tax document in paper form to the tax preparer at some later time closer to the tax return filing deadline, the taxpayer would not have to perform the multiple steps required to electronically send the tax document to the tax preparer at the current time.

The system described herein allows the taxpayer 102 to use a single piece of software having a graphical user interface. The software may be implemented on the taxpayer client device 104, the tax preparer client device 110, and a server 400. Using the single piece of software, the taxpayer 102 may view tax documents, sign tax documents, upload requested tax documents, download tax documents or prepared tax returns, review a prepared tax return, sign an E-File Authorization form, pay the tax preparer invoice, and make tax payments to tax authorities. Having all of the features in the software application presented using a common graphical user interface increases the convenience to the taxpayer 102 and the tax preparer 108. In addition, the process of preparing a tax return is streamlined and made more efficient and accurate, as fewer separate applications results in fewer opportunities for errors to be made.

Further, the communications between the taxpayer 102 and the tax preparer are secure and encrypted. Tax documents may contain many items of sensitive information, so data security in the communications between the taxpayer 102 and the tax preparer 108 are improved. Conventionally, a password to a shared remote database may be shared, or a message may be sent via email, or a payment may be made using an online payment interface. However, these may not be as secure as the system described herein, which secures the data being transmitted back and forth between the taxpayer 102 and the tax preparer 108. The data may be secured using a one or more of password protection, data encryption, or two-factor authentication.

The server 400 includes a signature unit 404 configured to facilitate signing of a form by the taxpayer 102. The signature unit 404 is in communication with the tax preparer client device 110 and the taxpayer client device 104. The signature unit 404 may receive, from the tax preparer client device 110, a document to be signed by the taxpayer 102. The signature unit 404 may send the document to be signed by the taxpayer 102 to the taxpayer client device 104. The taxpayer client device 104 may display the document using the graphical user interface of the taxpayer client device 104. The graphical user interface may also have a means for receiving a signature or input from the taxpayer 102, such as a touchscreen or a keyboard or an electronic pen and electronic pad. The taxpayer signature is received by the taxpayer client device 104. Taxpayer signature data is communicated from the taxpayer client device 104 to the server 400. In some embodiments, the system requires the taxpayer signature to be formatted in a particular data structure, and the taxpayer client device 104 transforms or manipulates the received taxpayer signature into the taxpayer signature data to be processed by the system.

The server 400 also includes a document upload unit 406. The document upload unit 406 is configured to receive a tax document from the taxpayer client device 104, as described herein. In some embodiments, the system requires the tax document to be formatted in a particular data structure, and the taxpayer client device 104 transforms or manipulates the tax document into tax document data to be processed by the system.

The server 400 also includes a messaging unit 408. The messaging unit 408 is configured to facilitate communications between the taxpayer client device 104 and the tax preparer client device 110. The messages received from the taxpayer client device 104 and/or the tax preparer client device 110 may be secured. In some embodiments, the messages are secured by the client devices and the server 400.

The server 400 also includes an E-File authorization unit 410. The E-File authorization unit 410 is configured to receive an E-File authorization from the taxpayer 102 via the taxpayer client device 104. The taxpayer client device 104 may display (via the graphical user interface) a prepared tax return for the taxpayer 102 to review. The taxpayer client device 104 may receive (via the graphical user interface) an E-File authorization from the taxpayer 102. The taxpayer 102 may provide the authorization using an input unit of the taxpayer client device 104, such as a touchpad or a keypad. E-File authorization data is communicated from the taxpayer client device 104 to the server 400. In some embodiments, the system requires the E-File authorization to be formatted in a particular data structure, and the taxpayer client device 104 automatically transforms or manipulates the received E-File authorization into the E-File authorization data to be used by the system. The E-File authorization unit 410 may also obtain any other data pertinent to the E-File authorization process, including obtaining and storing the internet protocol (IP) address of the taxpayer client device 104. The IP address of the taxpayer client device 104 may be later verified.

The server 400 also includes a payment unit 412. The payment unit 412 is configured to receive payment information (e.g., a credit card number or checking account number) from the taxpayer 102 via the taxpayer client device 104. The taxpayer 102 may provide the payment information using an input unit of the taxpayer client device 104, such as a touchpad or a keypad. Payment data is communicated from the taxpayer client device 104 to the server 400. In some embodiments, the system requires the payment information to be formatted in a particular data structure, and the taxpayer client device 104 automatically transforms or manipulates the received payment information into the payment data to be used by the system.

The server 400 may also include a tax return preparation unit 414 configured to automatically prepare a completed tax return based on the tax documents stored by the server 400, as described herein. Automatic preparation of the tax return may be initiated by the tax preparer 108. In other embodiments, the tax return preparation unit 414 is not a part of the server and is a part of a separate system for automatically preparing tax returns using the data collected and maintained by the system described herein.

The server 400 may also include a document sharing unit 416 configured to share any of the data described herein, such as tax documents and automatically prepared tax returns, for example, with a third party. The third party may be a financial advisor or a relative, for example.

The server 400 may also include a document download unit 418 configured to download any of the data described herein to the taxpayer client device 104 or the tax preparer client device 110.

Each of the signature unit 404, the document upload unit 406, the messaging unit 408, the E-File authorization unit 410, the payment unit 412, and the tax return preparation unit 414 may be implemented using one or more processors and one or more non-volatile memory. Each of the signature unit 404, the document upload unit 406, the messaging unit 408, the E-File authorization unit 410, the payment unit 412, and the tax return preparation unit 414 may be special-purpose electronic devices programmed for the purposes described herein.

Figure 5A:
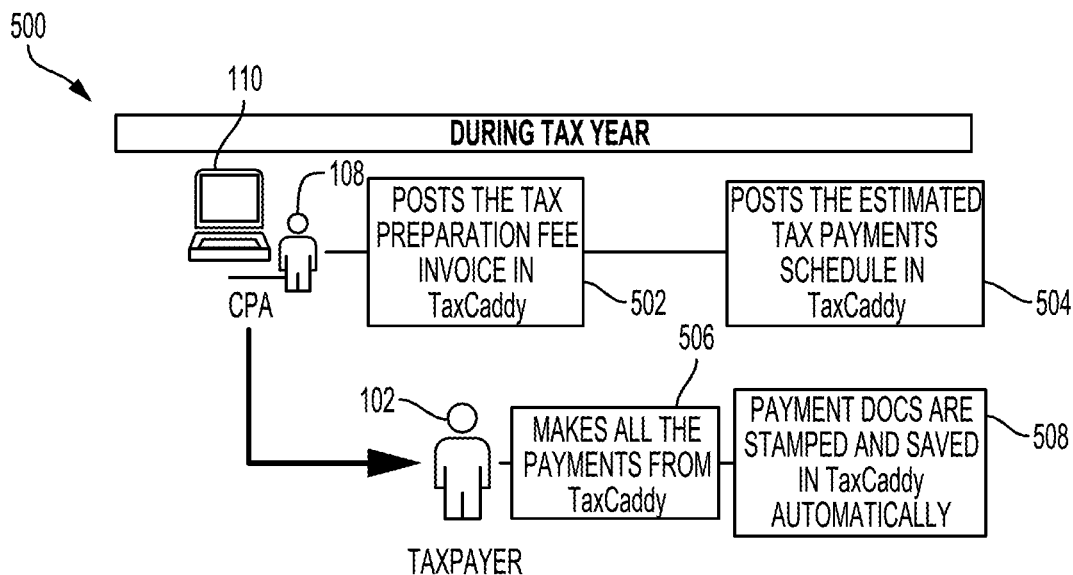
FIG. 5A illustrates a process of the taxpayer and the tax preparer during the tax year, according to an embodiment of the invention.

FIG. 5A illustrates a process 500 of the taxpayer 102 and the tax preparer 108 during the tax year. The tax preparer 108 posts a tax preparation fee invoice to the system (step 502). The tax preparer 108 also posts the estimated tax payments schedule to the system (step 504). The tax preparer 108 may communicate these liabilities (e.g., tax preparation fee invoice and the estimated payments schedule) from the tax preparer client device 110 to a server of the system. The payment of the liabilities may result in deductions or credits for the taxpayer 102 in the next year's tax return. In some embodiments, the liabilities are automatically identified and generated based on automatic preparation of a tax return by an automatic tax return preparation system for the taxpayer 102 for the current tax year.

The taxpayer 102 may view the liabilities on the taxpayer client device 104 via a graphical user interface. The graphical user interface may include a list of all liabilities, and an indication for each listed liability of whether the liability has been paid.

The taxpayer 102 may make all of the payments to the tax preparer 108 via the system (step 506), using the payment unit 412. In some embodiments, the taxpayer 102 may make tax payments to the appropriate taxing authority using the system as well. Taxing authorities may include the Internal Revenue Service, a state tax board, or local cities or municipalities, for example. The system automatically generates liability payment documentation indicating that the particular liability has been paid. The liability payment documents are saved in the server of the system and associated with the taxpayer 102. The payments of these liabilities may be used as a deduction or credit the following tax year. In some embodiments, the liability payment documents are part of the tax document collection data unit, and the tax document collection data unit is used by an automatic tax return preparation system to automatically prepare a tax return in the next year.

Figure 5B:
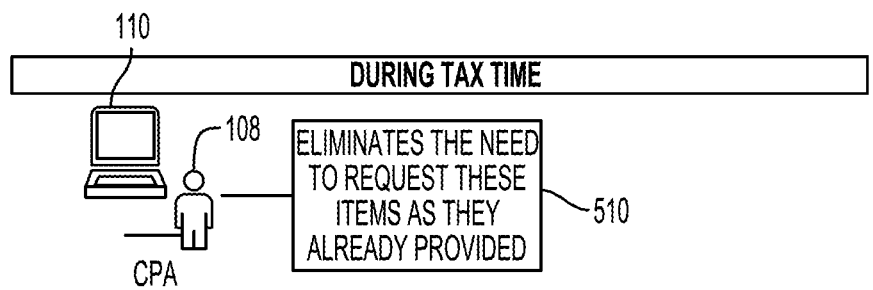
FIG. 5B illustrates a process of the tax preparer during the tax return preparation time, according to an embodiment of the invention.

As shown in FIG. 5B, as the deadline to file tax returns approaches the next year, the tax preparer 108 does not have to request the documents saved to the server of the system in step 508, as the tax preparer 108 already has access to these documents. These documents may provide evidence for a deduction or credit to be claimed by the tax preparer 108 for the taxpayer 102. By having these documents already saved by the server of the system, the tax preparer 108 does not have to rely on the taxpayer 102 to produce these documents, as the taxpayer 102 may have misplaced them. In addition, if the tax preparer is changed to a different individual or organization, the new tax preparer may not have the documents generated by the original tax preparer in steps 502 and 504.

In some embodiments, the tax return item list shown in the graphical user interface of the taxpayer client device 104 includes liabilities, and when payment is made for a particular liability and the liability payment documentation is received by the system, the particular liability may have an indication indicating that the liability has been paid.

Figure 6:
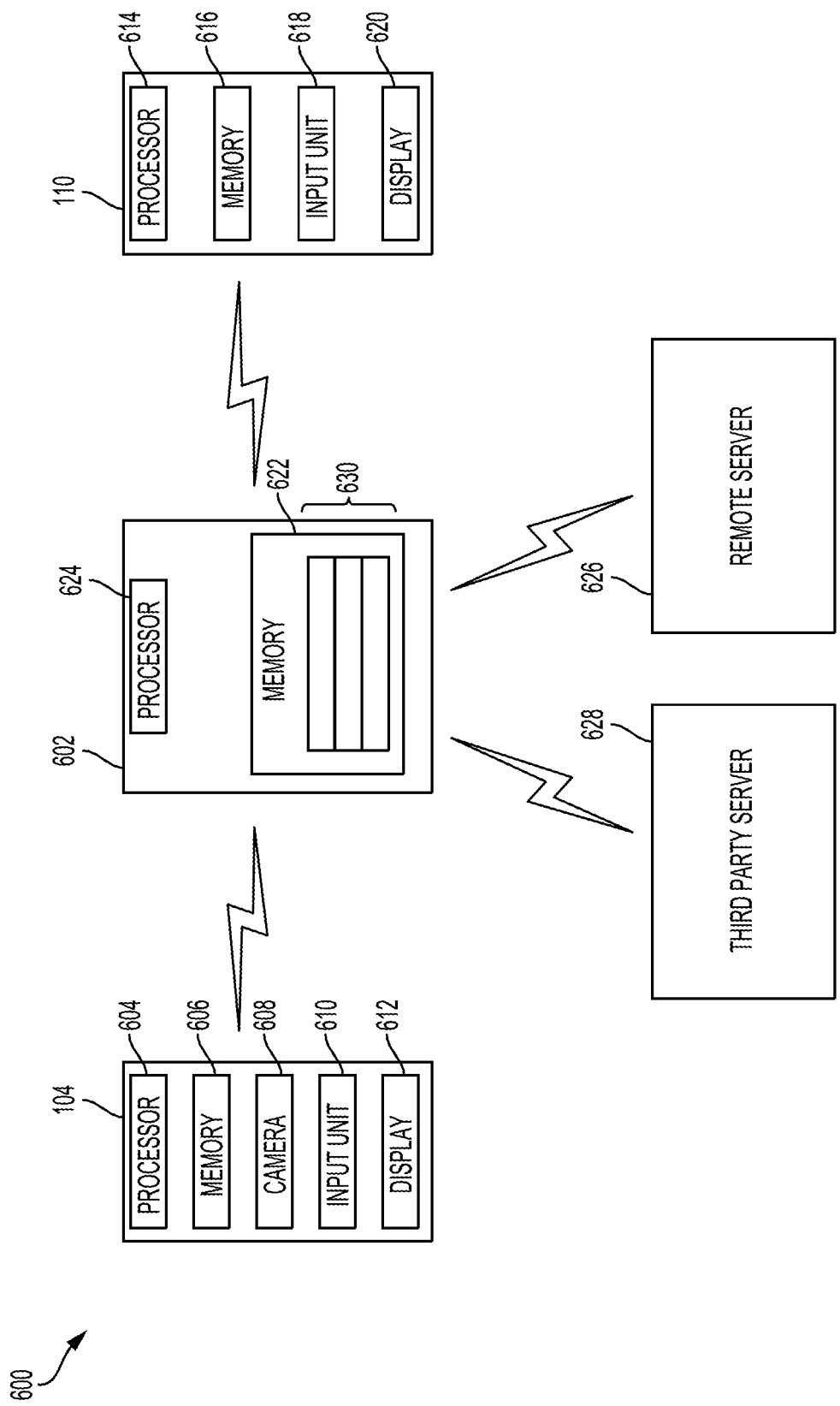
FIG. 6 illustrates an example system, according to an embodiment of the invention.

FIG. 6 illustrates an example system. The system 600 includes a client device 104 associated with the taxpayer 102, a client device 110 associated with the tax preparer 108, and a server 602.

The client device 104 associated with the taxpayer 102 includes a processor 604, a memory 606, a camera/scanner 608, an input unit 610, and a display 612. The processor 604 may be configured to execute instructions stored in the memory 606, which may be a non-transitory memory. The instructions executed by the processor 604 may include software associated with the system. The processor 604 may be one or more processors. The processor 604 is specifically and specially configured to perform the operations described herein, and in some embodiments, the client device 104 (in particular, the processor 604) is a special purpose machine for performing the operations described herein.

The camera/scanner 608 is configured to detect image data associated with a document, such as a tax document. The image data may be a digital representation of the document. The input unit 610 may be a keyboard, a touchscreen, a microphone, or any other device configured to receive an input from the taxpayer 102. The display 612 may display a graphical user interface of the software executed by the processor 604.

The memory 606 may store image data detected by the camera/scanner 608. The memory 606 may also store information associated with the taxpayer 102, such as an identifier used by the server 602 to identify the taxpayer 102. The memory 606 may also store tax document data and prior year tax return data.

The client device 110 associated with the tax preparer 108 includes a processor 614, a memory 616, an input unit 618, and a display 620. The processor 614 may be configured to execute instructions stored in the memory 616, which may be a non-transitory memory. The instructions executed by the processor 614 may include software associated with the system. The processor 614 may be one or more processors. The processor 614 is specifically and specially configured to perform the operations described herein, and in some embodiments, the client device 110 (in particular, the processor 614) is a special purpose machine for performing the operations described herein.

The input unit 618 may be a keyboard, a touchscreen, a microphone, or any other device configured to receive an input from the tax preparer 108. The display 620 may display a graphical user interface of the software executed by the processor 614.

The memory 616 may store information associated with the tax preparer 108, such as an identifier used by the server 602 to identify the tax preparer 108.

The server 602 includes a memory 622 configured to store data associated with the taxpayer 102. The data may include tax document data associated with the taxpayer 102, or account data associated with the taxpayer 102. The data stored in memory 622 may be encrypted and access to the data may be limited to those with sufficient credentials.

The server 602 includes a processor 624 configured to execute instructions stored in memory 622. The processor 624 may be configured to receive a tax document data file from the client device 104 associated with the taxpayer 102. The processor 624 may be configured to generate or create a tax document collection data unit 630 having one or more tax documents for a particular taxpayer. A tax document may be any document related to the preparation of a tax return, such as an account statement issued by an institution, a pay statement issued by an employer or a payroll management company, a record of a tax deduction, a questionnaire or other information provided by the taxpayer 102 for the preparation of the tax return. The tax document collection data unit 630 may be used by a tax preparation system (e.g., tax return preparation unit 414) to automatically prepare tax returns for the taxpayer. The processor 624 may be one or more processors. The processor 624 is specifically and specially configured to perform the operations described herein, and in some embodiments, the server 602 (in particular, the processor 624) is a special purpose machine for performing the operations described herein.

Memory 622 may store a plurality of tax document collection data units 630, as shown in FIG. 6. The data stored in memory 622 in the tax document collection data unit 630 may be stored in a tax document collection data format. The tax document collection data format may be a data format specifically designed for a tax preparation system to receive the tax document data and automatically prepare one or more tax returns. The tax document collection data unit 630 may include taxpayer data associated with the taxpayer 102, such as a user identifier. The tax document collection data unit 630 may also include a plurality of data cells or data regions containing tax document data for one or more tax documents. The tax document data in the plurality of cells of the tax document collection data format may be formatted in a structure where the tax preparation system is able to process the tax document data in a more efficient and accurate manner than manually entering in the data to the tax preparation software. In this way, the computing speed, efficiency, and accuracy of the computer system performing the automatic tax return preparation is improved.

In some embodiments, the server 602 also performs the functions of the automatic tax return preparation system. In some embodiments, the tax document collection data format is a unique and novel data format which may only be identified and interpreted by a particular tax preparation system. In many embodiments, a human being viewing the raw data of the tax document collection data format is unable to interpret the values or contents of the data stored within the tax document collection data format.

The processor 624 may control access to the memory 622. In particular, the processor 624 may control access to the tax document collection data units stored in memory 622. For example, the processor 624 may control access of a particular tax preparer 108 to access the tax document collection data unit 630 associated with taxpayer 102. In some embodiments, the access of a given tax preparer to the tax document collection data unit 630 associated with a given taxpayer is stored in an access table in memory 622. The access table may include pairings of taxpayers and tax preparers. The access table may be updated by the taxpayer 102 or the tax preparer 108. In some embodiments, a tax preparer may not be associated with a taxpayer in the access table without confirmation from the taxpayer. In some embodiments, a tax preparer may not be associated with a taxpayer without confirmation from the tax preparer. In some embodiments, termination of the association may require confirmation from the other party, and in other embodiments, termination of the association may not require confirmation from the other party and may be performed unilaterally.

When a new tax preparer replaces a previous tax preparer, the access table may be updated. In addition, the tax document collection data unit 630 may be reconfigured to ensure the previous tax preparer is unable to access or view the data in the tax document collection data unit. In some embodiments, the reconfiguration includes encrypting the data using a new key known to only the taxpayer and the new tax preparer.

The tax document collection data units may be stored in memory 622 local to the server 602 or may be stored in a remote storage 626, such as cloud based storage. In addition, prior year tax returns for a plurality of different taxpayers may be stored in memory. In addition, any data described herein being received by or used by the server of the system may be stored in memory 622.

The processor 624 may obtain documents to be included in the tax document collection data unit 630 from a third party, such as a bank, a payroll administrator, a brokerage, a lender, a financial institution, a utility service provider, or any provider of tax documents, for example. The third party data associated with the third party document may be stored in a third party server 628, and the taxpayer 102 may provide access to the third party data. The processor 624 may periodically request documents from the third party server 628, and the processor 624 may analyze the received documents to automatically determine whether the received documents are pertinent to preparation of a tax return. When the received documents are determined to not be pertinent to preparation of a tax return, the received documents may be deleted from memory 622. The received documents may be determined to be pertinent to preparation of the tax return based on the metadata of the received documents, the contents of the documents (determined via optical character recognition and/or text layer extraction), and/or the date associated with the documents. When the received documents are determined to be pertinent to preparation of a tax return, the received documents may be processed and saved in a tax document collection data unit 630 associated with the taxpayer 102.

Figure 7A:
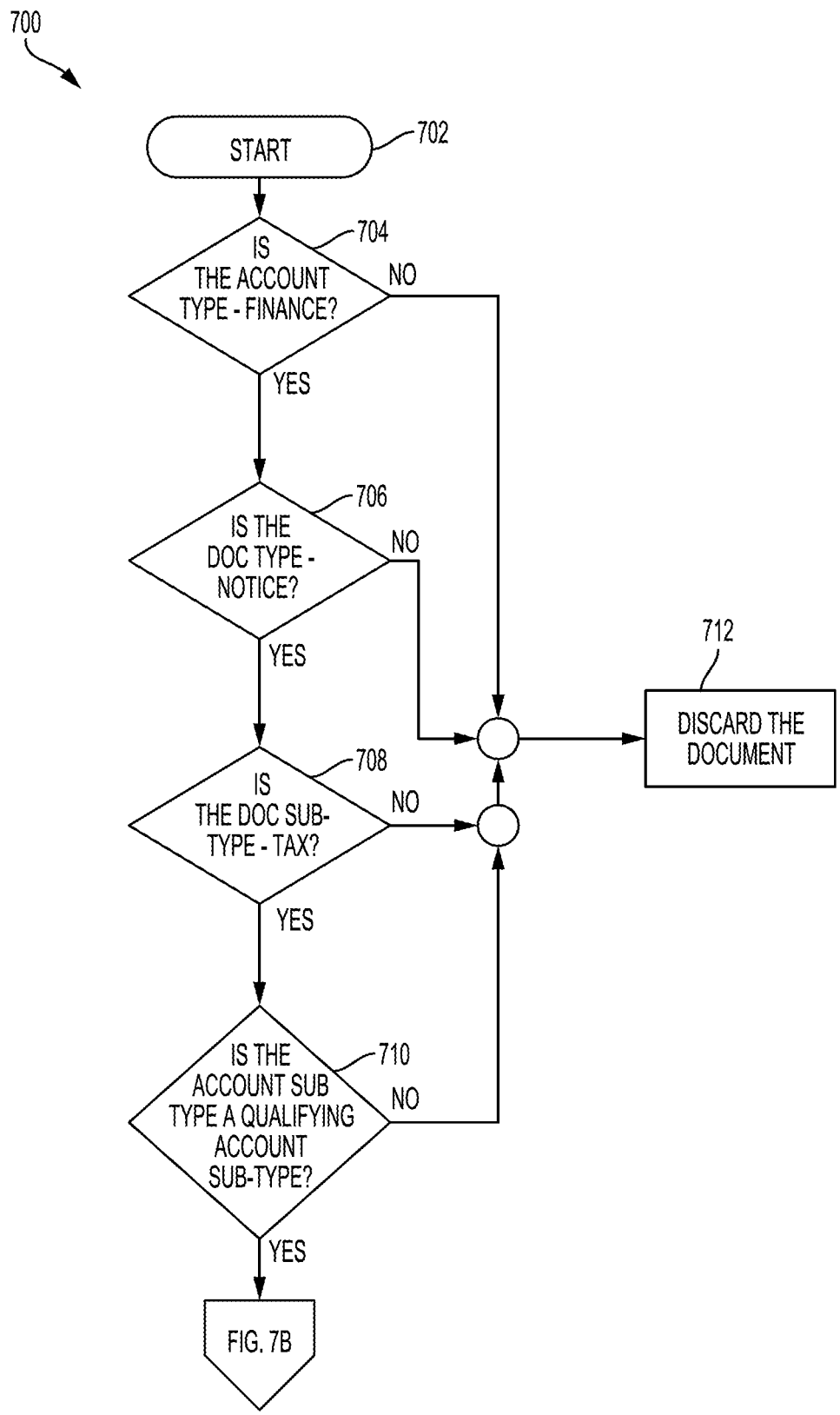
FIGS. 7A-7C illustrate a flow diagram of a process of automatically retrieving tax data from a third party server, according to an embodiment of the invention.
Figure 7B:
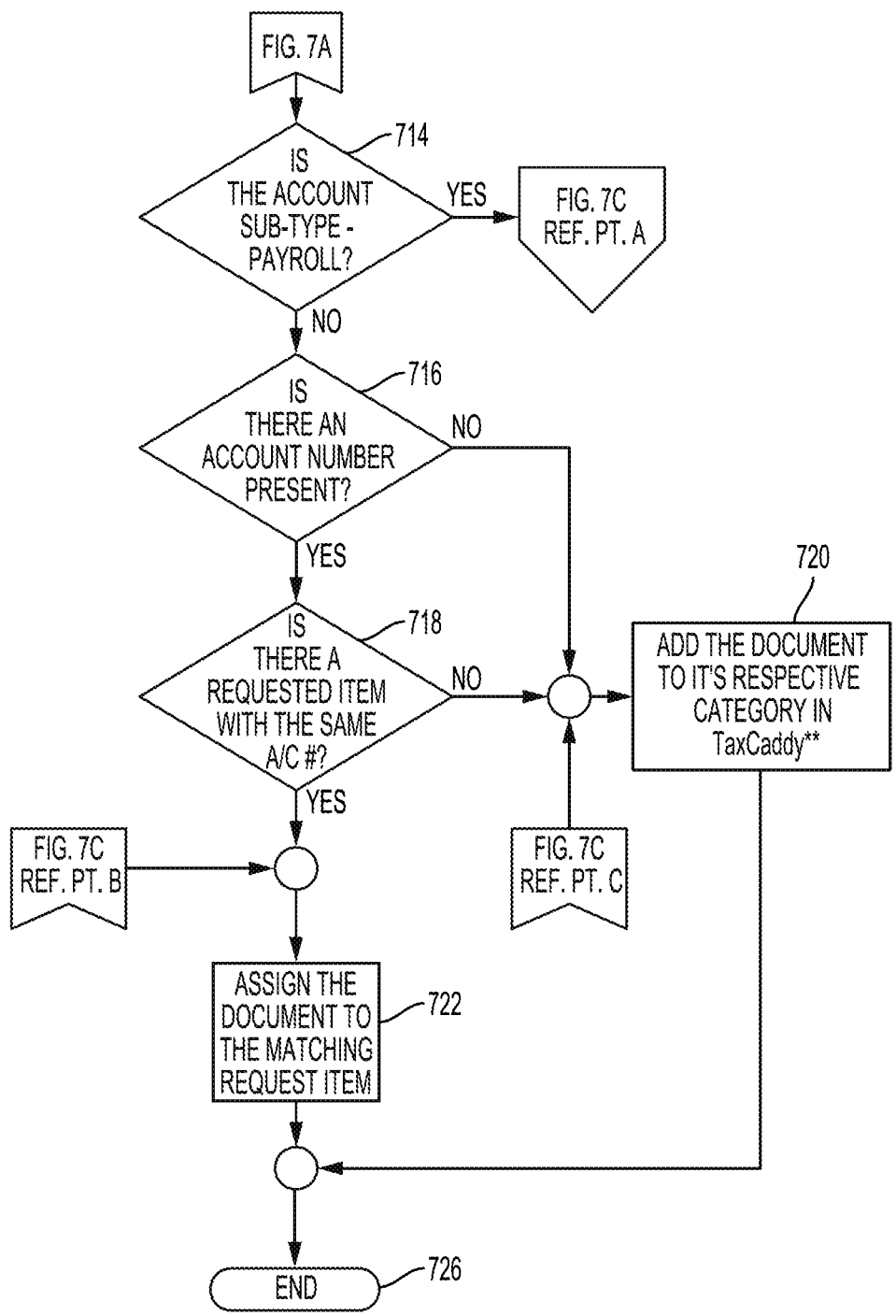
Figure 7C:
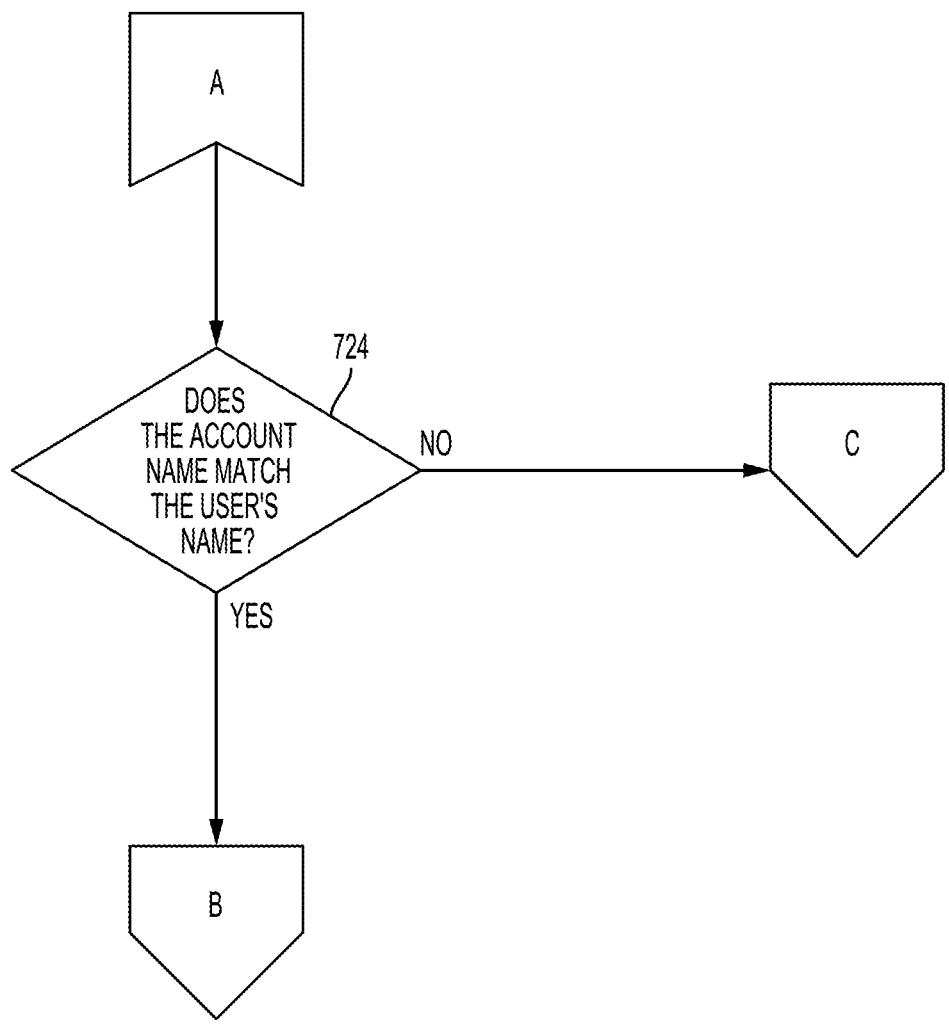

FIGS. 7A-7C illustrate a flow diagram of a process of automatically retrieving tax data from a third party server 628. The process 700 beings (step 702). The taxpayer 102 may provide the server 602 credentials (or authentication information) required to access the taxpayer's data on the third party server 628.

The processor 624 of the server 602 determines whether the account type associated with the data of the third party server 628 is finance (step 704). The account type may be determined based on the organization associated with the third party server 628, or metadata associated with the retrieved document. When the account type is not a finance type or other tax return related type, the document is discarded (step 712). In some embodiments, the document is erased from memory 622 and any memory associated with the server 602.

When the account type is a finance type, the document type is determined by the processor 624 of the server 602 (step 706). The document type may be determined based on the metadata associated with the document or based on values detected within the document. When the document type is not one that is needed for tax return preparation, the document is discarded (step 712). The system may determine whether the document is needed for tax preparation based on metadata and/or content of the document and/or the date of the document.

When the document type is one that is needed for tax return preparation, the document sub-type is determined (step 708). The document sub-type may be determined based on the metadata associated with the document or based on values detected within the document. When the document sub-type is not a tax sub-type, the document is discarded (step 712).

When the document sub-type is a tax sub-type, the account sub-type is determined (step 710). When the account sub-type is not a checking account, a savings, account, an investment account, a mortgage account, a payroll account, or a health savings account, the document is discarded (step 712).

When the account sub-type is a checking account, a savings, account, an investment account, a mortgage account, a payroll account, or a health savings account, it is determined whether the account sub-type is a payroll account (step 714). When the account sub-type is a payroll account, it is determined whether the name associated with the payroll account matches the name of the taxpayer 102 (step 724).

When the name does not match, the document is added to a respective category in memory 622 (step 720). In some embodiments, the document is transformed to be stored in the tax document collection data unit 630 associated with the taxpayer 102. When the name does match, the document is assigned to a matching requested item (step 722). In some embodiments, the document is transformed to be stored in the tax document collection data unit 630 associated with the taxpayer 102.

When the account sub-type is not a payroll account (as determined in step 714), it is determined whether there is an account number present (step 716). When there is no account number present, the document is added to a respective category in memory 622 (step 720). In some embodiments, the document is transformed to be stored in the tax document collection data unit 630 associated with the taxpayer 102.

When there is an account number present, it is determined whether there is a requested or outstanding item with the same account number (step 718). When there is no requested or outstanding item, the document is added to a respective category in memory 622 (step 720). In some embodiments, the document is transformed to be stored in the tax document collection data unit 630 associated with the taxpayer 102.

When the document is either assigned to a matching requested item or added to a category, the process 700 ends (step 726).

As each tax document is collected, the tax document may be compared to a list of outstanding tax return items from a prior year tax return, and when there is a match, the list of outstanding tax return items becomes modified to show that the tax document has been received for this year. In this way, the process 300 is automated, and the taxpayer 102 may have to provide fewer tax documents using the taxpayer client device 104.

When there is no match, a new tax return item may be added to the list of tax return items, and the unmatched tax document may be associated with the new tax return item.

Figure 8A:
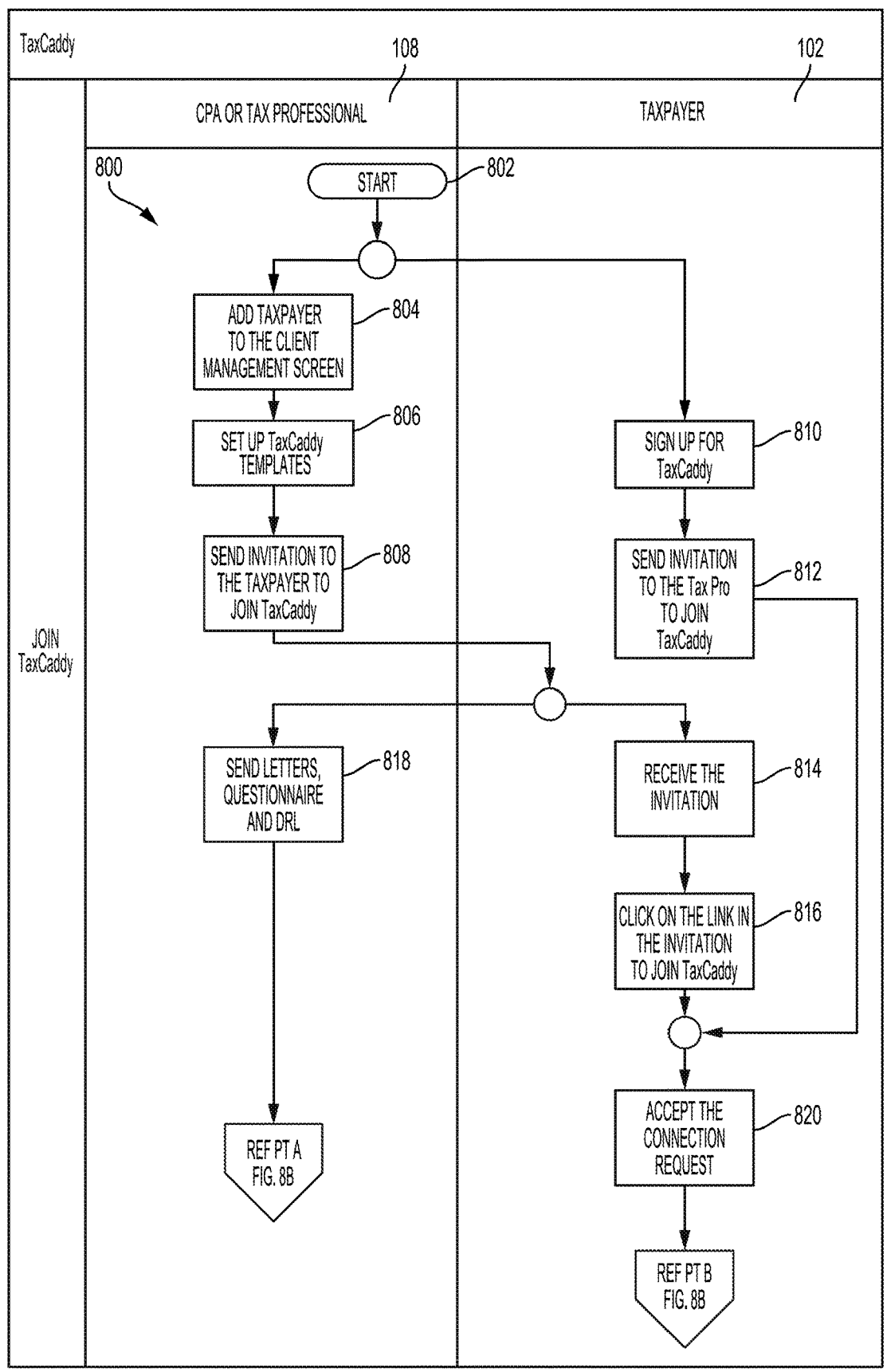
FIGS. 8A-8C illustrate a flow diagram of a process performed by the system, according to an embodiment of the invention.
Figure 8B:
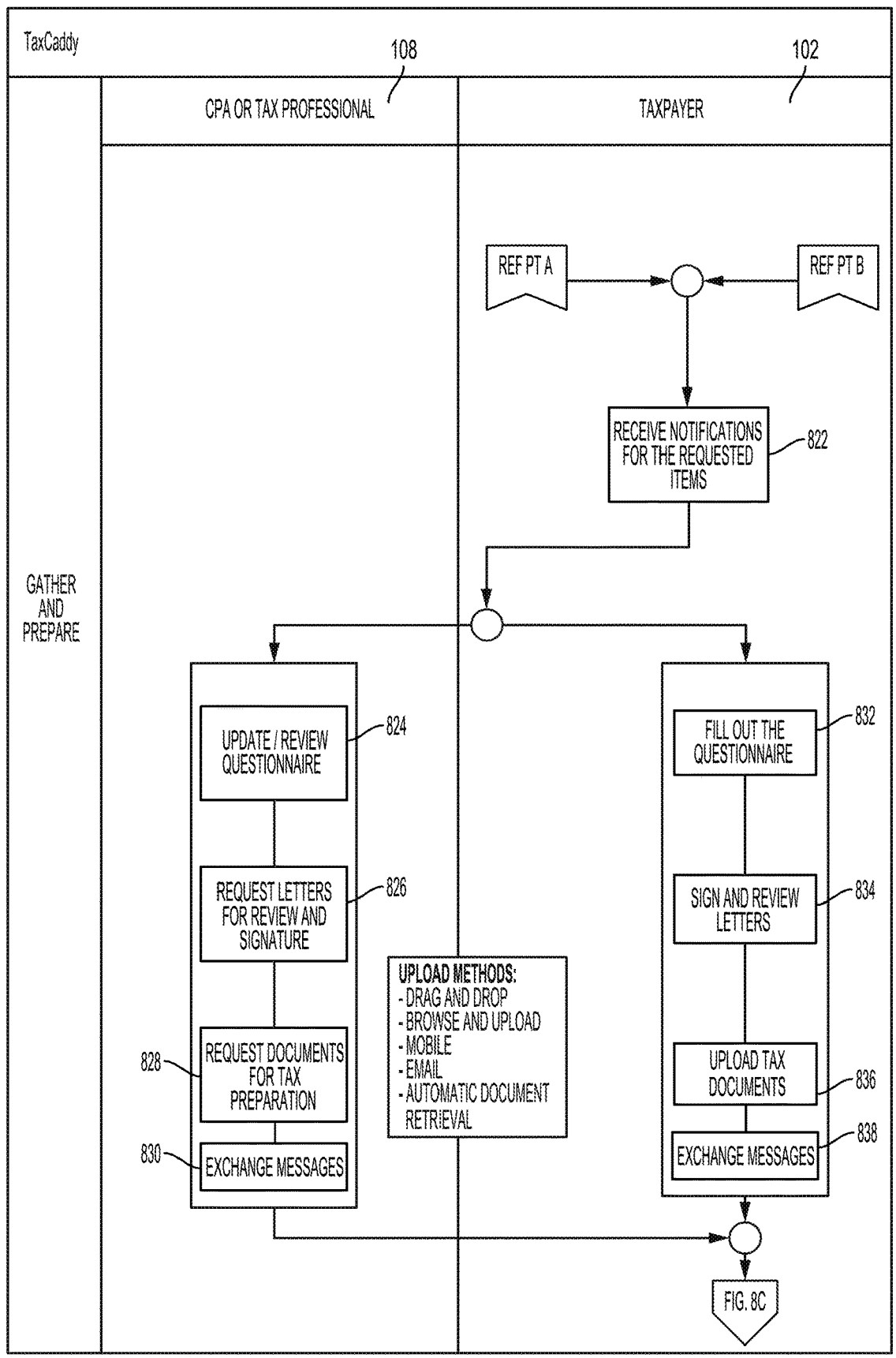
Figure 8C:
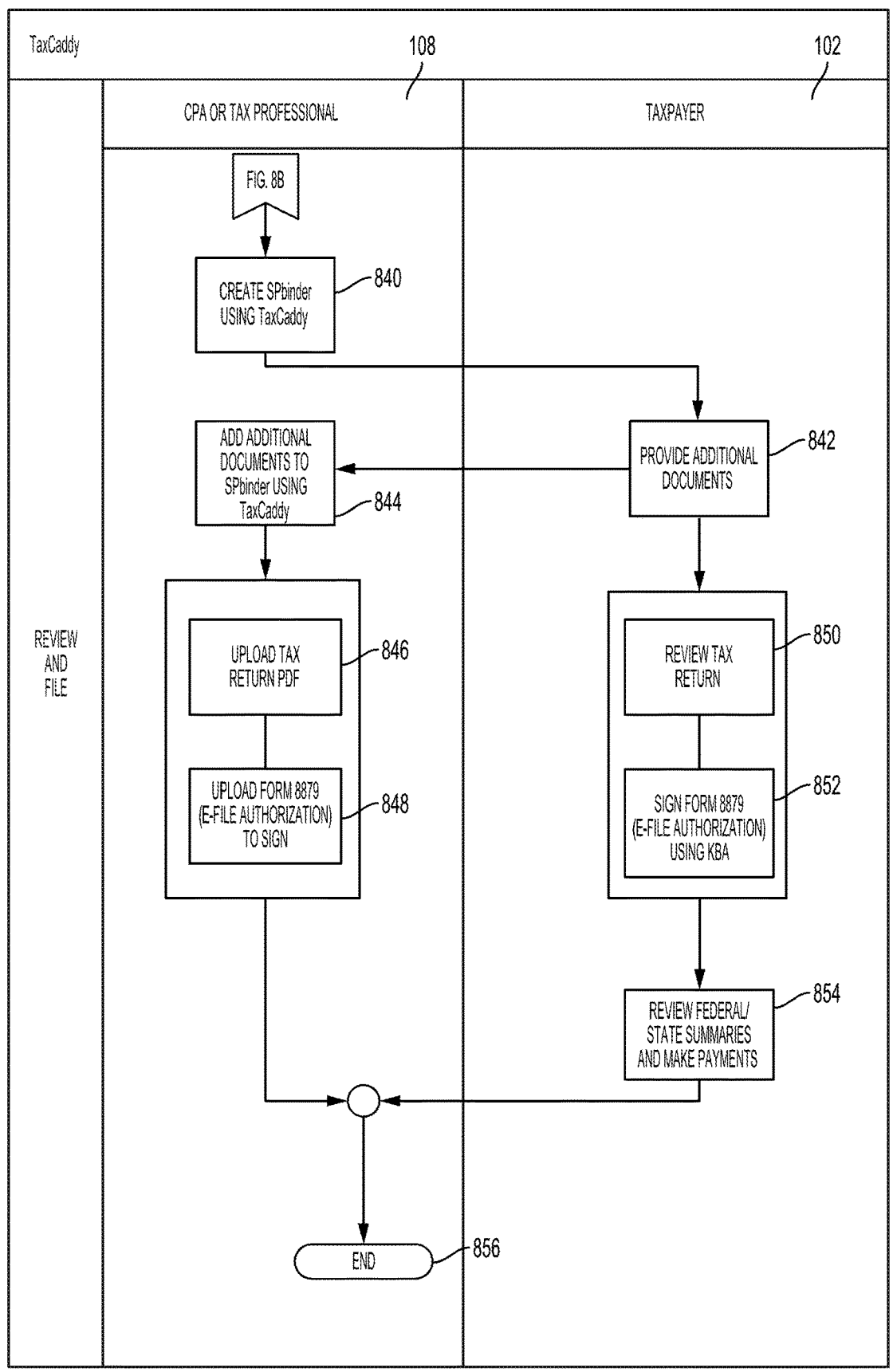

FIGS. 8A-8C illustrate a flow diagram of a process performed by the system. The process 800 begins (step 802) and the tax preparer 108 adds one or more taxpayers to the system via a client management screen of a graphical user interface (step 804). More specifically, the client device 110 associated with the tax preparer 108 communicates to the server 602 an identification of one or more taxpayers who may be potential clients of the tax preparer 108. Basic information of each taxpayer may be provided, such as name and email address.

The tax preparer 108 sets up templates (step 806). The templates may include an invitation template, a template letter asking the taxpayer to review the attached document and sign, a template questionnaire for the taxpayer to fill out, and a document request list template. The templates may have a default design with default text, and the design and text may be capable of being edited by the tax preparer 108.

An invitation to use the system is sent to the taxpayer 102 (step 808). In particular, the invitation is communicated by the server 602 to the client device 104 of the taxpayer 102.

The taxpayer 102 may sign up for the system (step 810). The taxpayer may provide basic information, such as name and email address. The taxpayer 102 may send an invitation to a tax preparer to use the system (step 812).

The taxpayer 102 receives the invitation to use the system (step 814). The invitation may be an electronic invitation embodied by an email with a link to register for the system in the email. The taxpayer 102 clicks the link in the invitation (step 816) and accepts the connection request from the tax preparer 108 (step 820).

In some embodiments, when the taxpayer 102 clicks on the link in the invitation and sets up an account, the link is associated with the tax preparer 108 and the tax preparer 108 is automatically connected to the taxpayer 102. The connection between the tax preparer 108 and the taxpayer 102 may be reflected in the access table stored in memory 622.

The tax preparer 108 may send letters, a questionnaire, or any other document to the taxpayer 102 for review or completion (step 818). Once the tax preparer 108 sends letters or questionnaires, or once the taxpayer accepts the connection request, the process proceeds to the taxpayer 102 receiving notifications for requested items (step 822). The notifications may be a text-based notification in the form of an email, text message, or smartphone notification, for example, or may be an audible notification in the form of a ring or chime or other sound emitted from a computer or smartphone of the taxpayer 102.

The taxpayer 102 fills out the questionnaire (step 832), signs and reviews the CPA letters (step 834), and uploads documents (step 836) and exchanges messages with the tax preparer 108 (step 838). Correspondingly, the tax preparer 108 updates and reviews the questionnaire (step 824), requests that one or more letters be reviewed and signed (step 826), requests documents from the taxpayer or uploads tax documents on behalf of the taxpayer (step 828), and exchanges messages with the taxpayer 102 (step 830).

A virtual and computer-based tax document storage unit (e.g., SPbinder or another application that enables tax documents to be viewed, edited, downloaded, and/or managed) used in preparing an automated tax return is created (step 840) and the taxpayer 102 may provide additional documents (step 842). In addition the tax preparer 108 may provide additional documents (step 844).

The virtual and computer-based tax document storage unit is provided to an automated tax return preparation system (e.g., tax return preparation unit 414). The automated tax return preparation system may be configured to only receive tax documents in the form of the virtual and computer-based tax document storage unit. The automated tax return preparation system generates a completed tax return, and provides it to the tax preparer 108. The tax preparer 108 may review the completed tax return, and upload the completed tax return for the taxpayer to review (step 846).

The taxpayer 102 may review the drafted tax return (step 850). The tax preparer 108 may upload an E-File authorization form (step 848) and the taxpayer 102 may sign the E-File authorization form (step 852). Steps 848 and 852 may be performed using the E-File authorization unit 410.

The taxpayer 102 may review a federal and state summary and make any payments (step 854) and the process ends (step 856). Any payments made may be stored by the system for use the following tax year, as illustrated in FIGS. 5A and 5B. All of the steps of process 800 may be performed using the client devices 104 and 110 and a graphical user interface provided by the client device 104 and 110.

Any systems or software described herein configured to automatically prepare a tax return may be responsible for automatically preparing the entire tax return, or may be responsible for automatically preparing a portion of the tax return, where the remaining portion of the tax return is to be completed by an individual, such as the tax preparer 108.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method comprising:
   receiving, by one or more processors, a first connection request from a taxpayer device for a first tax preparer device having a first tax preparer identifier to access a taxpayer account in a database, wherein the taxpayer account is associated with the taxpayer device;
   automatically associating, by the one or more processors and in response to receiving the first connection request, the taxpayer identifier of the taxpayer device with the first tax preparer identifier of the first tax preparer device;
   providing, by the one or more processors and to the first tax preparer device, access to the taxpayer account in the database;
   receiving, by the one or more processors, a first restriction request from the taxpayer device to restrict the first tax preparer device from accessing the taxpayer account in the database;
   automatically disassociating, by the one or more processors and in response to receiving the first restriction request, the taxpayer identifier of the taxpayer device with the first tax preparer identifier of the first tax preparer device to restrict the first tax preparer device from accessing the taxpayer account in the database;
   receiving, by the one or more processors, a second connection request from the taxpayer device for a second tax preparer device having a second tax preparer identifier to access the taxpayer account in the database;
   automatically associating, by the one or more processors and in response to receiving the second connection request, the taxpayer identifier of the taxpayer device with the second tax preparer identifier of the second tax preparer device; and
   providing, by the one or more processors and to the second tax preparer device, access to the taxpayer account in the database.

2. The method of claim 1, wherein at least one of the automatically disassociating or the automatically associating occurs in an access table.

3. The method of claim 1, wherein the taxpayer account includes digital tax information in a tax document collection data unit.

4. The method of claim 1, further comprising:
   transmitting, by the one or more processors, the second connection request to the taxpayer device; and
   receiving, by the one or more processors, the acceptance of the second connection request from the taxpayer device to access the taxpayer account.

5. The method of claim 1, further comprising:
   receiving, by the one or more processors and from the taxpayer device, digital tax information comprising information about a taxpayer, tax return items, tax data and image data from a tax document;
   providing, by the one or more processors, a file name to each of the tax return items of the digital tax information, wherein the file name identifies characteristics of the tax return item of the digital tax information including at least one of a type of tax return item, an entity administering the tax return item, the taxpayer identifier, or a tax year associated with the tax return item;
   determining, by the one or more processors, that the digital tax information is relevant to the taxpayer based on metadata and content obtained from at least one of optical character recognition or text layer extraction of the digital tax information from the tax document; and storing, by the one or more processors, the digital tax information and the file name of each tax return item of the digital tax information in data regions in a tax document collection data unit of a memory and in a tax document collection data format usable by a tax preparation system, wherein the tax document collection data format enables the tax preparation system to receive the digital tax information and automatically prepare one or more tax returns.

6. The method of claim 1, further comprising extracting, by the one or more processors, tax data from digital tax information in the taxpayer account by using at least one of the optical character recognition or the text layer extraction.

7. The method of claim 1, further comprising:
detecting, by the one or more processors, in tax data in the taxpayer account a type of the tax data, a format of the tax data, a location of the tax data within a tax document and value ranges of the tax data;
recognizing and interpreting the tax data based on a format of the tax data being in a tax document collection data format;
determining, by the one or more processors, that the taxpayer has an account at a financial institution based on the type of data, the format of data, the location of data and the value ranges;
determining, by the one or more processors, that the tax data includes activity on accounts in a current tax year such that the tax data is used in the current tax year;
obtaining, by the one or more processors, a list of prior tax return items from a prior year tax return of the taxpayer;
grouping, by the one or more processors, the list of the prior tax return items based on at least one of tax return item type, institution type, tax return item name, or institution name;
providing, by the one or more processors and to the taxpayer device, the list of the prior tax return items for display on a graphical user interface (GUI) of the taxpayer device; and
providing, by the one or more processors and to the taxpayer device, a reminder to obtain the tax return items for a current year that correspond to the list of the prior tax return items, in order to supplement digital tax information in the taxpayer account.

8. The method of claim 7, wherein the obtaining the list of the prior tax return items comprises at least one of obtaining the list of the prior tax return items by automatically detecting the tax return items from the prior year tax return or obtaining the list of the prior tax return items from a tax return preparation system.

9. The method of claim 1, further comprising:
receiving, by the one or more processors and from a third party system, third party digital tax information;
determining, by the one or more processors, whether the third party digital tax information is relevant to preparing a tax return in the current tax year based on at least one of account type, account number, name, document type, organization, metadata, values, content or date of the third party digital tax information;
deleting, by the one or more processors, the third party digital tax information, in response to the third party digital tax information not being relevant;

saving, by the one or more processors, the third party digital tax information, in response to the third party digital tax information being relevant;
assigning, by the one or more processors, the third party digital tax information to at least one of a tax category or to a matching tax item on a list of prior tax return items from the prior year tax return of the taxpayer;
adding, by the one or more processors, the third party digital tax information to the list of the prior tax return items, in response to the third party digital tax information not matching to the prior tax return items on the list of the prior tax return items;
populating, by the one or more processors, a field of a tax form with a subset of tax data and an account at the financial institution, based on the tax data used in the current tax year, the type of data, the format of data, the location of data and the value ranges; and
generating, by the one or more processors using an automated tax return preparation system, a completed tax return from the third party digital tax information and the tax form.

10. The method of claim 1, further comprising:
receiving, by the one or more processors and from the second tax preparer device, at least one of an engagement letter or a tax questionnaire; and
transmitting, by the one or more processors and to the taxpayer device, at least one of the engagement letter or the tax questionnaire.

11. The method of claim 1, further comprising receiving, by the one or more processors and from the taxpayer device, at least one of an adjustment of tax data or an adjustment of a field of a tax form.

12. The method of claim 1, further comprising:
receiving, by the one or more processors, a second restriction request from the first tax preparer device to restrict the first tax preparer device from accessing a taxpayer account in the database;
automatically disassociating, by the one or more processors and in response to receiving both the first restriction request and the second restriction request, the taxpayer identifier of the taxpayer device with the first tax preparer identifier of the first tax preparer device to restrict the first tax preparer device from accessing the taxpayer account in the database.

13. The method of claim 1, further comprising:
providing, by the one or more processors and to the taxpayer device, a button next to a list of the prior tax return items and next to a financial institution;
receiving, by the one or more processors and from the taxpayer device, a selection of the button indicating that one or more of the prior tax return items or the financial institution is no longer applicable in the current tax year; and
removing, by the one or more processors, the item from the list of the prior tax return items, in response to obtaining the tax return item for the current tax year that corresponds to the prior tax return item.

14. The method of claim 1, further comprising providing, by the one or more processors and to the taxpayer device, functionality for at least one of signing a tax form, signing an E-File Authorization form for a tax form, paying a tax preparer invoice, formatting digital tax information in a tax document collection data format usable by a tax preparation system or making tax payments to tax authorities.

15. The method of claim 1, further comprising obtaining and storing, by the one or more processors, an internet protocol (IP) address of the taxpayer device for verification.

16. The method of claim 1, further comprising downloading, by the one or more processors using a document download unit, at least one of digital tax information or a tax return to at least one of the taxpayer device, the first tax preparer device or the second tax preparer device.

17. The method of claim 1, further comprising:
receiving, by the one or more processors and from the second tax preparer device, at least one of a tax preparation fee invoice or estimated tax payment schedule; and
providing, by the one or more processors and to the taxpayer device, at least one of the tax preparation fee invoice or the estimated tax payment schedule, wherein at least one of the tax preparation fee invoice or the estimated tax payment schedule are automatically generated by a tax return preparation system.

18. The method of claim 1, wherein the disassociating further comprises at least one of reconfiguring a tax document collection data unit or encrypting digital tax information with a new key.

19. The method of claim 1, further comprising:
receiving, by the one or more processors and from the second tax preparer device, an identification of one or more taxpayer devices associated with the second tax preparer device;
transmitting, by the one or more processors and to the one or more taxpayer devices, a software link of an invitation to join, wherein the software link is associated with the second tax preparer device;
receiving, by the one or more processors and from the one or more taxpayer devices, an acceptance of the software link of the invitation to join; and
associating, by the one or more processors in an access table, the one or more taxpayer devices with the second tax preparer device.

20. A system comprising:
one or more processors, and
one or more tangible, non-transitory memories configured to communicate with the one or more processors,
the one or more tangible, non-transitory memories having instructions stored thereon that, in response to execution by the one or more processors, cause the one or more processors to perform operations comprising:
receiving, by the one or more processors, a first connection request from a taxpayer device for a first tax preparer device having a first tax preparer identifier to access a taxpayer account in a database, wherein the taxpayer account is associated with the taxpayer device;
automatically associating, by the one or more processors and in response to receiving the first connection request, the taxpayer identifier of the taxpayer device with the first tax preparer identifier of the first tax preparer device;
providing, by the one or more processors and to the first tax preparer device, access to the taxpayer account in the database;
receiving, by the one or more processors, a first restriction request from the taxpayer device to restrict the first tax preparer device from accessing the taxpayer account in the database;
automatically disassociating, by the one or more processors and in response to receiving the first restriction request, the taxpayer identifier of the taxpayer device with the first tax preparer identifier of the first tax preparer device to restrict the first tax preparer device from accessing the taxpayer account in the database;
receiving, by the one or more processors, a second connection request from the taxpayer device for a second tax preparer device having a second tax preparer identifier to access the taxpayer account in the database;
automatically associating, by the one or more processors and in response to receiving the second connection request, the taxpayer identifier of the taxpayer device with the second tax preparer identifier of the second tax preparer device; and
providing, by the one or more processors and to the second tax preparer device, access to the taxpayer account in the database.

* * * * *